United States Patent
Sun et al.

(10) Patent No.: US 9,960,887 B2
(45) Date of Patent: May 1, 2018

(54) METHOD AND APPARATUS OF SIGNAL TRANSMISSION AND RECEPTION IN A FILTER BANK MULTIPLE CARRIER SYSTEM

(71) Applicant: Samsung Electronics Co., Ltd, Gyeonggi-do (KR)

(72) Inventors: Pengfei Sun, Beijing (CN); Dalin Zhu, Beijing (CN); Bin Yu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 15/192,978

(22) Filed: Jun. 24, 2016

(65) Prior Publication Data

US 2016/0380689 A1 Dec. 29, 2016

(30) Foreign Application Priority Data

Jun. 24, 2015 (CN) .......................... 2015 1 0353680

(51) Int. Cl.
*H04L 1/20* (2006.01)
*H04L 25/03* (2006.01)

(52) U.S. Cl.
CPC ........ *H04L 1/206* (2013.01); *H04L 25/03159* (2013.01); *H04L 2025/03414* (2013.01)

(58) Field of Classification Search
CPC ............... H04L 1/206; H04L 25/03159; H04L 2025/03414
See application file for complete search history.

(56) References Cited

U.S. PATENT DOCUMENTS 9,843,463 B2 * 12/2017 Jiang ....................... H04L 5/005
2005/0037722 A1 * 2/2005 Koga ....................... H04B 3/54
455/205

(Continued)

FOREIGN PATENT DOCUMENTS

WO 2013160582 A1 10/2013
WO 2015046907 A1 4/2015

OTHER PUBLICATIONS

PCT International Search Report, International Application No. PCT/KR2016/006803, dated Jun. 24, 2016, 3 pages.

(Continued)

*Primary Examiner* — Mohammad S Anwar

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Provided is a method of transmitting signals in an FBMC/OQAM system. Data symbols transmitted in category-2 data symbols or category-3 data symbols are determined according to interference from all of adjacent OQAM data symbols and an intrinsic interference coefficient of category-2 data symbols interference experienced by category-3 data symbols in a user data block, so that transmission symbols in the category-3 data symbols composed of transmitted data symbols and interference include target data symbols of the category-3 data symbols and target data symbols of the category-2 data symbols. A transmitting device transmits the data symbols of the category-3 data symbols and data symbols transmitted in category-2 data symbols together with other data symbols in the user data block.

20 Claims, 27 Drawing Sheets

(56) References Cited

U.S. PATENT DOCUMENTS

| | | | |
|---|---|---|---|
| 2008/0219343 A1* | 9/2008 | Wu | H04L 25/0228 |
| | | | 375/232 |
| 2015/0049836 A1 | 2/2015 | Li et al. | |
| 2015/0358130 A1* | 12/2015 | Chen | H04B 7/0413 |
| | | | 375/267 |
| 2016/0211999 A1* | 7/2016 | Wild | H04L 27/264 |

OTHER PUBLICATIONS

Patent Cooperation Treaty, International Application No. PCT/KR2016/006803, "Written Opinion of the International Searching Authority," dated Aug. 31, 2016, 6 pages, International Searching Authority, Daejeon, Korea.

Yao Cheng et al., "Non-linear precoding for the downlink of FBMC/OQAM based multi-user MIMO systems," Mar. 3-5, 2015, 1-6 pages, publisher VDE VERLAG GMBH • Berlin • Offenbach, Germany.

Rostom Zakaria et al., "A Novel Filter-Bank Multicarrier Scheme to Mitigate the Intrinsic Interference : Application to MIMO Systems," Mar. 3, 2012, 1112-1123 pages, vol. 11, No. 3, publisher IEEE, Piscataway, NJ.

\* cited by examiner

METHOD AND APPARATUS OF SIGNAL TRANSMISSION AND RECEPTION IN A FILTER BANK MULTIPLE CARRIER SYSTEM

CROSS-REFERENCE TO RELATED APPLICATION AND CLAIM OF PRIORITY

The present application is related to and claims the benefit under 35 U.S.C. § 119(a) of a Chinese patent application filed in the China Intellectual Property Office on Jun. 24, 2015 and assigned Serial No. 201510353680.X, the entire disclosure of which is incorporated herein by reference.

TECHNICAL FIELD

The present disclosure relates to wireless communications, and to a method and an apparatus of signal transmission and reception in a filter bank multiple carrier (FBMC) system.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Mobile communication technology faces fierce challenges due to the increasing demand of the internet and the internet of things (IoT). According to a report of international telecommunication union (ITU), ITU-R M.[IMT.BEYOND 2020.TRAFFIC], the mobile traffic volume in 2020 is estimated to be almost 1000 times of that in 2010 (e.g., in the 4G era), and the number of connected user terminals may exceed 17 billion. The number of connected devices will see more drastic growth when a mass of IoT devices are gradually connected to the mobile communication network. In view of the challenge, the fifth generation mobile communication technology (5G) for the 2020 era is being widely studied by the communication industry and the academia. The ITU report ITU-R M.[IMT.VISION] discusses the framework and overall target of 5G, detailing the prospect of demands for 5G, application scenarios, and key parameters. The ITU report ITU-R M.[IMT.FUTURE TECHNOLOGY TRENDS] provides information regarding future trends of the 5G technology, aiming at remarkably increasing system throughput, providing uniform user experiences, improving extensibility to support IoT, reducing time delay, increasing power efficiency, reducing costs, increasing network flexibility, supporting emerging services, improving flexibility in utilizing the spectrum resources and the like.

Modulation waveforms and multiple access techniques are important basis for air-interface design in all of wireless communication systems, and 5G is no exception. Orthogonal frequency division multiplexing (OFDM) is a typical multi-carrier modulation (MCM) technique. At present, OFDM has been widely used in audio/video broadcasting systems and civil communication systems, e.g., long term evolution (LTE) systems of 3GPP, digital video broadcasting (DVB) and digital audio broadcasting (DAB) in Europe, very-high-bit-rate digital subscriber loop (VDSL), IEEE802.11a/g Wireless Local Area (WLAN), IEEE802.22 wireless regional area network (WRAN), IEEE802.16 world interoperability for microwave access (WiMAX), and so on. OFDM divides a broad band channel into multiple parallel narrow band subchannels/subcarriers to convert transmission of a high rate data flow in a frequency selective channel into transmission of multiple lower rate data flows in multiple parallel flat subchannels. OFDM can greatly improve the anti-multipath interference capabilities of the system. Furthermore, modulation and de-modulation of OFDM can be simplified using inverse fast fourier transform/fast fourier transform (IFFT/FFT). In addition, the use of cyclic prefix (CP) converts the linear convolution of a channel into circular convolution. According to characteristics of circular convolution, when the length of CP is larger than the maximum multipath time delay in the channel, inter-symbol interference (ISI) can be eliminated simply by using single tap frequency domain channel equalization. The processing complexity of receivers is remarkably reduced. CP-OFDM can generate modulation waveforms satisfying the demands of 4G mobile broadband (MBB) services, but may have insufficiencies in 5G scenarios. For example, the CP for anti-ISI may significantly reduce the spectrum efficiency in 5G low time delay scenarios. Because low time delay transmission may greatly reduce the length of OFDM symbols while the length of CP is decided only by the channel impulse response, the ratio of CP length to OFDM symbol length may become very large. The overhead will result in remarkable loss in spectrum efficiency, and it is unacceptable. For another example, strict requirement on time synchronization may cause large signaling overhead which is necessary to maintain close-loop synchronization in 5G IoT scenarios. Further, the strict time synchronization scheme may make frame structures less flexible and cannot satisfy different synchronization demands of different types of services. For still another example, the rectangular pulse employed by OFDM may result in large out-of-band leakage because the side lobes of the waveform roll off very slowly, which is also the reason why OFDM is very sensitive to carrier frequency offset (CFO). 5G may be required to provide access/share of spectrum fragments more flexibly, but the out-of-band leakage of OFDM will greatly limit the flexibility of spectrum access, i.e., a large number of frequency domain guard band is needed. Therefore, the spectrum efficiency is reduced. The above insufficiencies are mainly resulted from intrinsic characteristics of OFDM. Although proper measures may be adopted to mitigate the effect of the insufficiencies, the measures will increase the system design complexity, and the problems cannot be solved fundamentally.

Therefore, according to an ITU report ITU-R M. [IMT.FUTURE TECHNOLOGY TRENDS], a few new waveform modulation techniques (based on MCM) are proposed for 5G. Among the new waveform modulation techniques, filter bank multiple carrier (FBMC) has become one of hot topics being studied. Since FBMC allows flexibility in design of prototype filters, filters having good time/frequency localization (TFL) can be used for shaping transmission waveform to generate transmission signals with good characteristics, e.g., not needing CP for anti-ISI which improves spectrum efficiency, low out-of-band leakage which allows flexibility in providing access to spectrum fragments and insensitivity to CFO. Typical FBMC systems usually adopt an offset quadrature amplitude modulation (OQAM) technique to maximize spectrum efficiency, thus are generally referred to as FBMC/OQAM systems or OFDM/OQAM systems.

FBMC has some good characteristics that OFDM does not have, thus gains attention in 5G research. FBMC, however, also faces challenges when applied to wireless communication systems due to some intrinsic deficiencies, which are being studied. One of the problems to be solved is a long head and tail effect of time domain waveforms generated by filters used by FBMC, which is also referred to as transition period problem. In uplink transmission of short data bursts, if the length of data bursts are extended to cover the tail so as to avoid overlapping of the tail with the head of other data bursts, fewer symbols will be transmitted within effective time and spectrum efficiency will be reduced. Thus, FBMC is regarded to be only suitable for transmission of long data bursts. If the length of data bursts does not cover the tail, the tail may overlap with the head of other data bursts. If the overlapping problem is not solved properly, there will be severe interference, which also reduces the spectrum efficiency. Besides the inter-user interference, in a time division duplexing (TDD) system, the uplink/downlink switch time should also be increased to avoid uplink/downlink interference, but this will also reduce the spectrum efficiency. In addition, the head and tail effect may also bring challenges for system flexibility and system performance in aspects such as frequency hopping, asynchronous transmission. A solution to the problem is to simply cut off the tail to avoid the tail overlapping with the head of other data bursts. But truncating the waveform may distort the signals, which also reduces the spectrum efficiency. In addition, truncating the waveform may extend the waveform in the frequency domain and increase inter-carrier interference (ICI). Thus, signal truncation is not an effective measure.

In view of the foregoing, deficiencies of FBMC may be dealt with to strengthen the competitiveness of FBMC as a candidate technique for 5G besides exploiting its advantages. For services based on sporadic access in 5G networks, especially in the IoT scenarios, it is necessary to find an effective solution to the problems resulted from the head and tail effect.

SUMMARY

To address the above-discussed deficiencies, it is a primary object to solve the head and tail effect problem in data bursts transmission in an FBMC system. At present, there is the need of an effective method to reduce the impact of the head and tail effect on system performances. Thus, various examples provide a method of signal generation, transmission and reception and corresponding apparatus in an FBMC system. The technical mechanism adopts a properly design of data blocks and pre-processing/pre-coding schemes to maximize the spectrum efficiency without truncating the tail of FBMC signals, and effectively reduce the interference between data blocks resulted from a tail overlapping with the head of another data bursts, and enhance communication quality of users.

Various examples provide a method of signal generation, transmission and reception in an FBMC system.

The method of signal transmission in an FBMC system may include:

determining actually transmitted data symbols of category-2 data symbols or category-3 data symbols according to intrinsic interference experienced by the category-3 data symbols from all of adjacent offset quadrature amplitude modulation (OQAM) data symbols and intrinsic interference coefficients from the category-2 data symbols to the category-3 data symbols, so that category-3 data symbols which is a composite of the actually transmitted data symbols and the interferences comprises the information of both target data symbols of the category-3 data symbols and target data symbols of the category-2 data symbols; category-1 data symbols are the first $n_1$ OQAM symbols from the head of a user data block and the first $n_2$ OQAM symbols from the tail of the user data block, the category-2 data symbols are the first $n_2 < n_1$ OQAM symbols from the head of the category-1 data symbols and the first $n_2 < n_1$, $n_1$ OQAM symbols from the tail of the category-1 data symbols, the category-3 data symbols are OQAM symbols in the category-1 data symbols excluding the category-2 data symbols, $n_2 < n_1$, $n_1$ and $n_2$ are pre-defined positive integers; and transmitting, by a transmitting device, the actually transmitted data symbols of the category-3 data symbols and the actually transmitted data symbols of the category-2 data symbols to a receiving device together with other data symbols in the user data block.

In an example, the category-2 data symbols are the first OQAM symbol from the head of the user data block and the first OQAM symbol from the tail of the user data block, the category-3 data symbols are the second OQAM symbol from the head of the user data block and the second OQAM symbol from the tail of the user data block; the actually transmitted data symbols of the category-3 data symbols are the target data symbols of the category-3 data symbols; wherein determining the actually transmitted data symbols of the category-2 data symbols according to interference experienced by the category-3 data symbols from all of adjacent OQAM data symbols and the intrinsic interference coefficients from the category-2 data symbols to the category-3 data symbols comprises:

calculating the actually transmitted data symbols of the category-2 data symbols according to the actually transmitted data symbols of the category-3 data symbols, intrinsic interference experienced by the category-3 data symbols from adjacent OQAM symbols excluding the category-2 data symbols and the category-3 data symbols in the user data block, intrinsic interference between subcarriers of the category-3 data symbols and the intrinsic interference coefficients from the category-2 data symbols to the category-3 data symbols, so that symbols which is a composite of the actually transmitted data symbols of the category-3 data symbols and the intrinsic interference are complex data symbols comprising the information of both the target data symbols of the category-2 data symbols and the target data symbols of the category-3 data symbols; wherein the target data symbols and actually transmitted data symbols of the category-3 data symbols serve as real parts and imaginary parts of the complex data symbols alternately and are corresponding to the same subcarrier.

In an example, the method of calculating the actually transmitted data symbols of the category-2 data symbols may include:

calculating, intrinsic interference experienced by a first data symbol of category-3 data symbols from adjacent OQAM symbols excluding the category-2 data symbols and the category-3 data symbols, calculating self interference experienced by the first data symbol of the category-3 data symbols from adjacent subcarriers of the category-3 data symbol in the same time slot; calculating the sum of the intrinsic interference and the self interference and the first data symbol of the category-3 data symbols, and calculating the difference between the target data symbols and the sum; when an actually transmitted data symbol of the first data symbol is real, obtaining the imaginary part of the difference as residual intrinsic interference in the first data symbol; when the actually transmitted data symbol of the first data symbol is imaginary, obtaining the real part of the difference as the residual intrinsic interference in the first data symbol; combining residual intrinsic interferences of all of the category-3 data symbols into residual intrinsic interference of a category-3 data symbol vector as the interference experienced by the category-3 data symbol vector from the category-2 data symbol vector, calculating the actually transmitted data symbol of each of the category-2 data symbols according to the interference experienced by the category-3 data symbol vector and a matrix composed of intrinsic interference coefficients from the category-2 data symbol vector to the category-3 data symbol vector; wherein the category-2 data symbol vector is a set composed of all of the category-2 data symbols in the user data block, the category-3 data vector is a set composed of all of the category-3 data symbols in the user data block.

In an example, the intrinsic interference and the self interference are calculated according to intrinsic interference coefficients between OQAM symbols and the first data symbol; the intrinsic interference coefficients are determined by parameters of a prototype filter employed for generating the OQAM symbols.

In an example, the category-2 data symbols may include the first OQAM symbol from the head of the user data block and the first OQAM symbol from the tail of the user data block, the category-3 data symbols comprise category-3 OQAM symbols and category-3 quadrature amplitude modulation (QAM) data symbols; the category-3 QAM data symbols are the second OQAM symbol from the head of the user data block and the second OQAM symbol from the tail of the user data block, and the category-3 OQAM data symbols are the third OQAM symbol from the head of the user data block and the third OQAM symbol from the tail of the user data block; the actually transmitted data symbols of the category-2 data symbols are dummy data symbols; wherein determining the category-3 data symbols according to the interference experienced by the category-3 data symbols from all of the adjacent OQAM data symbols comprises:

calculating actually transmitted data symbols of the category-3 OQAM symbols and the category-3 QAM symbols according to interference experienced by the category-3 OQAM symbols from second category-3 QAM symbols, interference experienced by first category-3 QAM symbols from second category-3 QAM symbols in adjacent subcarriers, interference experienced by the second category-3 QAM symbols from adjacent category-3 OQAM symbols and interference experienced by the second category-3 QAM symbols from first category-3 symbols in adjacent subcarriers, so that category-3 OQAM symbols which is a composite of the actually transmitted data symbols and the interference from the second category-3 QAM symbols equal to the target data symbols of the category-3 OQAM symbols, category-3 QAM symbols which is a composite of the first category-3 QAM symbols and the interference from the second category-3 QAM symbols in the symbols equal to the target data symbols of the category-3 OQAM symbols, and category-3 QAM symbols which is a composite of the second category-3 QAM symbols and the interference from adjacent category-3 OQAM symbols and the interference from the first category-3 QAM symbols equal to the target data symbols of the category-2 data symbols; wherein the actually transmitted data symbols of the category-3 QAM symbols are complex symbols; in the first category-3 QAM symbols, the target data symbols and actually transmitted data symbols serve as real parts and imaginary parts alternately in a different alternate manner with that in adjacent category-3 OQAM symbols, a second portion of the second category-3 QAM symbols are complex symbols excluding the first category-3 QAM symbols.

In an example, the method of calculating the actually transmitted data symbols of the category-3 OQAM symbols and the actually transmitted data symbols of the category-3 QAM symbols may include:

determining an inherent interference correlation matrix between the category-3 QAM symbols and the category-3 OQAM symbols according to interference in the category-3 OQAM symbols caused by second category-3 QAM symbols, interference in the first category-3 QAM symbols caused by second category-3 QAM symbols in adjacent subcarriers, interference in the second category-3 QAM symbols caused by adjacent category-3 OQAM symbols and interference in the second category-3 QAM symbols caused by first category-3 symbols in adjacent subcarriers, calculating transmitted data symbols in the category-3 OQAM symbols and the category-3 QAM symbols according to a fact that the inherence interference correlation matrix equals to a first symbol sequence; the first symbol sequence is a symbol sequence composed of target data symbols of all of the category-3 OQAM symbols, target data symbols of all of category-3 QAM symbols and target data symbols of all of the category-2 data symbols.

In an example, the interferences are calculated according to intrinsic interference coefficients between OQAM symbols; the intrinsic interference coefficients are determined by parameters of the prototype filter employed for generating the OQAM symbols.

In an example, the time/frequency resources allocated to the user data block may be configured via downlink control information beforehand.

The method of signal reception in an FBMC system may include:

receiving a user data block transmitted by a transmitting device, determining a category of an offset quadrature amplitude modulation (OQAM) symbol to be demodulated in the user data block according to a position of the OQAM symbol; if the OQAM symbol is a category-2 data symbol, skipping demodulation of the data symbol; if the OQAM symbol is a category-3 data symbol, demodulating to obtain target data symbols of category-2 data symbols and target data symbols of category-3 data symbols; and if the OQAM symbol is neither category-2 data symbol nor a category-3 data symbol, extracting a real part or an imaginary part of the OQAM symbol as a received data symbol; wherein category-1 data symbols are the first $n_1$ OQAM symbols from the head of the user data block and the first $n_2$ OQAM symbols from the tail of the user data block, the category-2 data symbols are the first OQAM symbols from the head of the category-1 data symbols and the first OQAM symbols from the tail of the category-1 data symbols, and the category-3 data symbols are OQAM symbols in the category-1 data symbols excluding the category-2 data symbols.

In an example, the category-2 data symbols are the first OQAM symbol from the head of the user data block and the first OQAM symbol from the tail of the user data block, the category-3 data symbols are the second OQAM symbol from the head of the user data block and the second OQAM symbol from the tail of the user data block;

if the OQAM symbol is a category-3 data symbol, the real part and the imaginary part of the OQAM symbol are extracted as two received data symbols.

In an example, the category-2 data symbols may include the first OQAM symbol from the head of the user data block and the first OQAM symbol from the tail of the user data block, the category-3 data symbols comprise category-3 OQAM symbols and category-3 quadrature amplitude modulation (QAM) data symbols; the category-3 QAM data symbols are the second OQAM symbol from the head of the user data block and the second OQAM symbol from the tail of the user data block, and the category-3 OQAM data symbols are the third OQAM symbol from the head of the user data block and the third OQAM symbol from the tail of the user data block; if the OQAM symbol is a category-3 QAM symbol, the real part and the imaginary part of the OQAM symbol are extracted as two received data symbols; and if the OQAM symbol is a category-3 OQAM symbol, the real part or the imaginary part of the OQAM symbol is extracted as a received data symbol.

The apparatus of signal transmission in an FBMC system may include a symbol calculating circuit and a transmitter; wherein the symbol calculating circuit is configured to determine actually transmitted data symbols of category-2 data symbols or actually transmitted data symbols of category-3 data symbols according to interference experienced by the category-3 data symbols from all of adjacent offset quadrature amplitude modulation (OQAM) data symbols and intrinsic interference coefficients from the category-2 data symbols to the category-3 data symbols, so that category-3 data symbols which is a composite of the actually transmitted data symbols and the interferences include target data symbols of the category-3 data symbols and target data symbols of the category-2 data symbols; category-1 data symbols are the first OQAM symbols from the head of a user data block and the first OQAM symbols from the tail of the user data block, the category-2 data symbols are the first OQAM symbols from the head of the category-1 data symbols and the first OQAM symbols from the tail of the category-1 data symbols, the category-3 data symbols are OQAM symbols in the category-1 data symbols excluding the category-2 data symbols; and the transmitter is configured to transmit the actually transmitted data symbols of the category-3 data symbols and the actually transmitted data symbols of the category-2 data symbols to a receiving device together with other data symbols in the user data block.

The apparatus of signal reception in an FBMC system may include a category determining circuit and a demodulating circuit; wherein the category determining circuit is configured to receive a user data block transmitted by a transmitting device, determine a category of an offset quadrature amplitude modulation (OQAM) symbol to be demodulated in the user data block according to a position of the OQAM symbol;

the demodulating circuit is configured to skip demodulation of the OQAM symbol if the OQAM symbol is a category-2 data symbol, demodulate to obtain target data symbols of category-2 data symbols and target data symbols of category-3 data symbols if the OQAM symbol is a category-3 data symbol; extract a real part or an imaginary part of the OQAM symbol as a received data symbol if the OQAM symbol is neither a category-2 data symbol nor a category-3 data symbol; and wherein category-1 data symbols are the first $n_1$ OQAM symbols from the head of the user data block and the first $n_1$ OQAM symbols from the tail of the user data block, the category-2 data symbols are the first $n_2$ OQAM symbols from the head of the category-1 data symbols and the first $n_2$ OQAM symbols from the tail of the category-1 data symbols, and the category-3 data symbols are OQAM symbols in the category-1 data symbols excluding the category-2 data symbols, $n_2 < n_1$, $n_1$ and $n_2$ are pre-defined positive integers.

According to various examples, when transmitting multi-carrier signals, plural data symbols respectively at the head and the tail of a user data block may be classified to be category-2 data symbols. When transmitting data, the actually transmitted data is constructed according to interference between the category-2 data symbols and adjacent category-3 data symbols so that received category-3 data symbols together with interference include target data symbols of the category-3 data symbols and target data symbols of the category-2 data symbols. As such, a receiving device may not only obtain the target data symbols of the category-3 data symbols but also the target data symbols of the category-2 data symbols by processing received category-3 data symbol without having to demodulate the category-2 data symbols. As such, the interference between data blocks resulted from a tail of a data block overlapping with the head of another data block can be avoided while not reducing the data transmission efficiency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system and device. The present disclosure is hereinafter further described in detail with reference to the accompanying drawings as well as examples so as to make the objective, technical solution and merits thereof more apparent.

A filter bank multiple carrier (FBMC) can generate signal waveforms with better time and frequency localization (TFL) by using prototype filter parameters, for example, isotropic orthogonal transform algorithm (IOTA), extended gaussian function (EGF) and PHYDYAS of Europe, and the like. FBMC adopts a prototype filter with good TFL to implement pulse shaping of signals on each subcarrier, and as a result, (1) FBMC can suppress ISI resulted from multi-path without a cyclic prefix (CP), thus can provide higher spectrum efficiency and power efficiency than OFDM, and provide better reception performances in presence of large time errors, thus does not require strict transmission synchronization; (2) due to the good frequency localization, FBMC can maintain a low level of out-of-band leakage while transmitting signals in narrow frequency bands, thus can suppress ICI resulted from Doppler frequency shift, phase noises, or the like. Thus, FBMC has large potentials in application scenarios such as cognitive radio (CR), fragmented spectrum access, asynchronous transmission, and the like.

Figure 1:
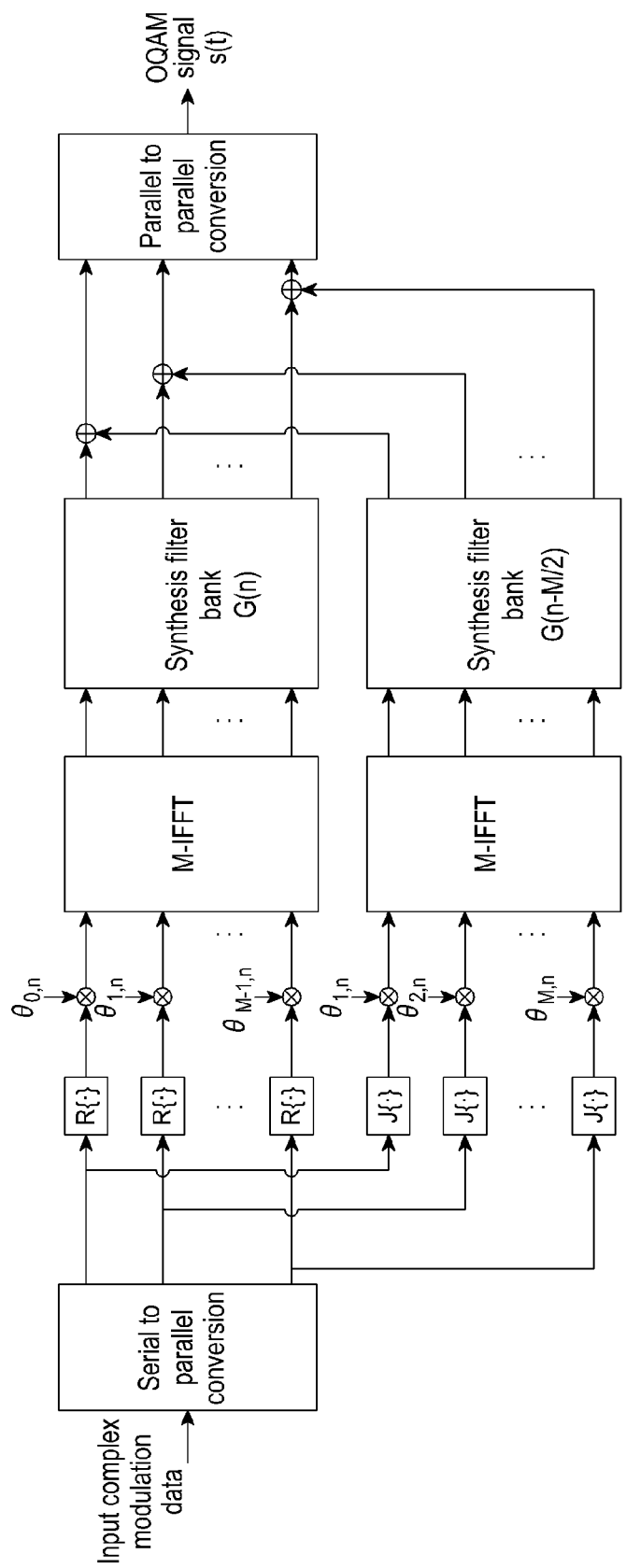
FIG. 1 illustrates a schematic diagram for signal generation and transmission in an FBMC/OQAM system according to an embodiment of the present disclosure.

An FBMC system may adopt the OQAM technique to obtain the highest spectrum efficiency of FBMC, which is referred to as FBMC/OQAM or OFDM/OQAM. In an FBMC/OQAM system, a QAM symbol may be divided into two signals. Each of the two signals may be modulated to be a real part or an imaginary part of a subcarrier alternately. The two modulated signals are transmitted alternately in the time domain. When influence of the channel is not considered, a receiving device may recover the transmitted signal by extracting the real part or the imaginary part of the signal on each subcarrier alternately. FIG. 1 illustrates a schematic diagram for signal generation and transmission in an FBMC/OQAM system according to an embodiment of the present disclosure. The function of each module can be understood according to the formula of the OQAM signal. The equivalent of a base band form of a continuous-time FBMC/OQAM signal may be expressed using the following formula (1):

$$s(t) = \Sigma_{n\in\mathbb{Z}} \Sigma_{m=0}^{M-1} a_{m,n} \underbrace{j^{m+n} e^{j2\pi m v_0 t} g(t-n\tau_0)}_{g_{m,n}(t)} \quad (1)$$

In the formula, $(\bullet)_{m,n}$ denotes a frequency-time point, $a_{m,n}$ denotes a real modulated signal, i.e., a pulse amplitude modulation (PAM) symbol, transmitted on the m'th subcarrier of the n'th symbol, $a_{m,n}$ is the value of the real part or the imaginary part of a complex QAM symbol $c_{m,\tilde{n}}$ whose symbol period is $\tau=2\tau_0$, e.g., $\Re\{\bullet\}$ and $\Im\{\bullet\}$ are the operations of obtaining the real part and obtaining the imaginary part; j symbolizes an imaginary number, $\theta_{m,n}=j^{m+n}$ denotes the real numbers and the imaginary numbers occur alternately; M being an even number denotes the number of subcarriers; $\mathbb{Z}$ is a set composed of transmitted symbols; $v_0$ denotes the interval between subcarriers; $\tau_0$ is the OQAM symbol period, i.e., $\tau_0=\tau/2=1/(2v_0)$; g denotes a prototype filter function whose time domain impulse response is generally K times of $\tau$ in length, thus waveforms of adjacent (2K−1) symbols may partly overlap with each other in the time domain, thus K is also referred to as the overlapping factor of a filter; $g_{m,n}(t)$ denotes a synthesis filter function for modulating $a_{m,n}$.

It can be seen that the symbol rate of an OQAM system is 2 times of that of conventional OFDM systems, and an OQAM system does not have a CP. Since OQAM modulated symbols are real symbols, each OQAM symbol bearers half of number of the information of conventional OFDM systems. That is, the signal transmission efficiency of an OQAM system is identical to that of an OFDM system without CP.

The real domain orthogonality of an OQAM system is implemented by a properly designed prototype filter function g. The inner product of a synthesis filter function of a transmitting device and the analysis filter function of a receiving device may satisfy or approximately satisfy formula (2), i.e., the prototype filter is required to satisfy:

$$\Re\{\underbrace{\langle g_{m,n} | g_{m',n'} \rangle}_{\langle g \rangle_{m,n}^{m',n'}}\} = \Re\left(\int g_{m,n}(t) g_{m',n'}^*(t) dt\right) = \delta_{m,m'} \delta_{n,n'} \quad (2)$$

In the formula, * denotes complex conjugate, $\langle \bullet | \bullet \rangle$ denotes inner product, if m=m' and n=n', $\delta_{m,n'}=1$, $\delta_{n,n'}=1$; if m≠m' or n≠n', they are 0, i.e., the inner product is a pure imaginary number, the inner product is denoted by $\langle g \rangle_{m,n}^{m',n'}$. It can be seen that there is only interference to the imaginary parts between different subcarriers and different symbols. When an FBMC/OQAM signal s(t) is transmitted via a distortion-free channel, the receiving device may process the received signal according to formula (3) using an analysis filter (AF) $g_{m,n}^*(t)$ that matches with the synthesis filter (SF) $g_{m,n}(t)$ for transmitting the signal to obtain perfect reconstruction (PR) of the real signal $a_{m,n}$ that is actually transmitted. η0 denotes the noise. Then the complex QAM signal $c_{m,\tilde{n}}$ is synthesized for demodulation to obtain the original data.

$$\hat{a}_{m,n} = \Re\{y_{m,n}\} = \Re\{\langle (s(t)+n(t))|g_{m,n}\rangle\} = a_{m,n} + \eta_0$$
$$m=0,\ldots,M-1, n\in\mathbb{Z} \quad (3)$$

Figure 2:
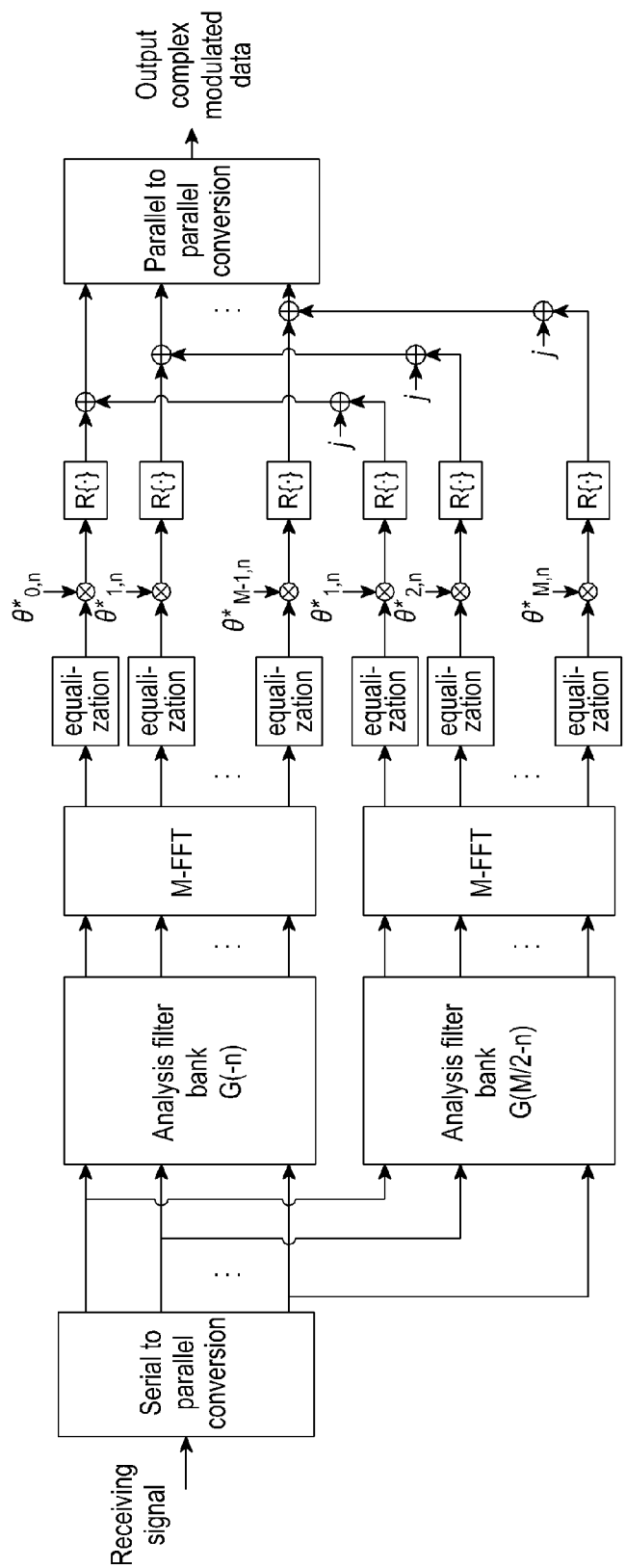
FIG. 2 illustrates a schematic diagram for signal reception and demodulation in an FBMC/OQAM system according to an embodiment of the present disclosure.

FIG. 2 illustrates a schematic diagram of reception and demodulation of an FBMC/OQAM signal according to an embodiment of the present disclosure. The function of each module can be understood from the above OQAM demodulation formula. The above is the modulation and demodulation principle of the OQAM system.

In an actual communication system, channels may not be distortion-free. Channels are generally frequency-selective fading due to multi-path, and/or are time-selective fading due to the Doppler frequency shift. Denoting the channel impulse response as $h(t)=\|h\|\vec{h}$, where $\|h\|$ represents the change in amplitude, and $\vec{h}$ represents the change in phase, and supposing the channel does not change within a symbol period and within the bandwidth of a subcarrier, $H_{m,n}$ denotes the frequency response of channel h(t) at symbol n on subcarrier m, the received signal may be denoted as:

$$r(t) = \Sigma_{n\in\mathbb{Z}} \Sigma_{m=0}^{M-1} H_{m,n} a_{m,n} g_{m,n}(t) + n(t) \quad (4)$$

The complex channel may $H_{m,n}$ damage the orthogonality between OQAM signals in the real domain. For example, during demodulation of $a_{m_0,n_0}$, according to formula (5), $a_{m_0,n_0}$ cannot be recovered by taking the real part of $y_{m_0,n_0}$, and extra operations should be performed to eliminate or reduce the damage to the orthogonality caused by $H_{m,n}$, $H_{m,n}$.

$$y_{m_0,n_0} = \quad (5)$$
$$\langle r(t) | g_{m_0,n_0}\rangle = H_{m_0,n_0} a_{m_0,n_0} + \underbrace{\sum_{n\in\mathbb{Z}} \sum_{\substack{m=0 \\ (m,n)\neq(m_0,n_0)}}^{M-1} H_{m,n} a_{m,n} \langle g \rangle_{m,n}^{m_0,n_0}}_{I_{m_0,n_0}} + \eta_0$$

In formula (5), $I_{m_0,n_0}$ is related with the localization characteristics of the prototype filter, thus is also referred to as intrinsic interference. According to characteristics of the prototype filter function g, among all the elements of the intrinsic interference at $(m_0, n_0)$, only a limited number of adjacent symbols $(m,n)\neq(m_0,n_0)$ may generate non-negligible influence, i.e., pure imaginary $\langle g \rangle_{m,n}^{m_0,n_0}$ has an absolute value that is too large to be neglected only at limited positions $(m,n)\neq(m_0, n_0)$, while at other positions, the absolute value is very small, e.g., being zero or proximate to zero. Compared with the noise, the latter portion in the formula can be neglected, and only the limited number of adjacent symbols is considered. Those values at $(m,n)\neq(m_0, n_0)$ that cannot be neglected may be denoted by a set $\Omega_{\Delta m,\Delta n}=\{(p,q), |p-m_0|\leq\Delta m, |q-n_0|\leq\Delta n\}$ (the set is corresponding to the TFL characteristics of the prototype filter function), and $I_{m_0,n_0}$ may be converted into:

$$I_{m_0,n_0} = \underbrace{\sum_{(p,q)\in\Omega_{\Delta m,\Delta n}} H_{p,q} a_{p,q} \langle g \rangle_{p,q}^{m_0,n_0}}_{\xi_{m_0,n_0}} + \underbrace{\sum_{(p',q')\notin\Omega_{\Delta m,\Delta n}} H_{p',q'} a_{p',q'} \langle g \rangle_{p',q'}^{m_0,n_0}}_{J_{m_0,n_0}:\ \text{negligible}} + \eta_0 \qquad (6)$$

According to formulae (5) and (6), in order to recover $a_{m_0,n_0}$ by frequency domain channel equalization to eliminate $\xi_{m_0,n_0}$, the condition defined in formula (7) may be satisfied. That is, although the channels are time-varying multi-path channels, the channels are correlated within the area denoted by $\Omega_{\Delta m,\Delta n}$, and the prototype filter may be designed to match with the channel characteristics. The better TFL of the prototype filter, the smaller is the area denoted by $\Omega_{\Delta m,\Delta n}$, and the easier the conditions of formula (7) is to be satisfied.

$$H_{m_0,n_0} \approx H_{p,q}, (p,q) \in \Omega_{\Delta m,\Delta n} \qquad (7)$$

The signal through the reception filter as shown in formula (5) may be approximated as the form in formula (8):

$$y_{m_0,n_0} \approx H_{m_0,n_0} a_{m_0,n_0} + \xi_{m_0,n_0} \approx \qquad (8)$$
$$H_{m_0,n_0}\left(a_{m_0,n_0} + \underbrace{\sum_{(p,q)\in\Omega_{\Delta m,\Delta n}} a_{p,q} \langle g \rangle_{p,q}^{m_0,n_0}}_{\zeta:\ \text{pure imaginary value}}\right) + \eta_0$$

The transmitted $a_{m_0,n_0}$ can be recovered by equalizing the channel frequency response at $(m_0,n_0)$ and then obtaining the real part.

As stated above, FBMC/OQAM symbols partially overlap with each other in the time domain, the subcarriers are not orthogonal in the frequency domain to each other in the complex field as in the OFDM system, but the influences of the channels can be eliminated through simple frequency domain equalization when the OQAM signals are real-imaginary alternate and the prototype filter is properly designed to obtain good TFL so that the demodulated signal satisfies the condition of formula (7) to recover the real domain orthogonality. Then the transmitted signal can be demodulated by taking the real part or the imaginary part. Typical equalization and detection of an FBMC/OQAM signal may be presented by the following formula (9). The SINR (signal-to-interference-and-noise ratio) represents the signal to interference and noise ratio when there is multi-user interference.

$$\Re\left\{\frac{r(t)H_{m,n}^*}{\|H_{m,n}\|^2+SINR}\bigg|g_{m,n}(t)\right\} \propto \hat{a}_{m,n} \qquad (9)$$

For downlink transmission or single user uplink transmission, the condition of formula (7) may be satisfied basically by properly setting the subcarrier interval and data transmission time as long as the prototype filter is designed to match with the delay spread and/or Doppler frequency shift of the channels, and thus the ICI and ISI can be neglected. But the inventor finds that multi-user data block transmission in an FBMC/OQAM system cannot easily satisfy the condition of formula (7) because channels via which signals from different users to a base station are generally not correlated with each other. The set $\Omega_{\Delta n} = \{|q-n_0| \le \Delta n\}$ in which symbols from different users overlap with each other in the frequency domain and are adjacent to each other in the time domain cannot be regarded as correlated. This is also the reason why scenarios such as uplink transmission of multi-user data blocks, TDD uplink/downlink switching and frequency hopping of the uplink shared channel and the like needs an effective solution to specially process the tail of an FBMC/OQAM signal.

The head and tail effect is illustrated first. Resources of a communication system are generally divided into time-frequency resource units (also referred to as RE) according to time and frequency. The REs, which are the smallest units of resources, are grouped to form resource blocks (RB) for facilitating scheduling. For example, the transmission time interval (TTI) and subframe (also referred to as burst) in communication standards refer to basic RB in the time domain. RB in the frequency domain is defined using bandwidth, e.g., subcarriers. Data blocks of users are mapped onto RBs for transmission. OFDM adopts rectangular waveforms, thus symbols in an RB are arranged one after another without overlapping with each other. But in FBMC/OQAM, since the prototype filter is long in length, the length of each symbol does not equal to the symbol period as in OFDM, but is longer than the symbol period. Although symbols are transmitted at an interval of $\tau_0$, a data block formed by such symbols may have a tail both at the head and the tail. For example, a system may have a total of M=256 subcarriers, a data block may include a total of 28 OQAM symbols ($\mathbb{Z} = \{0, 1, 2, \ldots, 27\}$) a repetition factor K=4, and the prototype filter parameter is PHYDYAS filter. The time domain response may be:

$$g(0) = 0,$$
$$g(l) = 1 - 1.94392\cos\left(\frac{2\pi l}{L_g}\right) + 1.414\cos\left(\frac{4\pi l}{L_g}\right) - 0.47029\cos\left(\frac{6\pi l}{L_g}\right),$$
$$1 \le l \le L_g - 1,\ L_g = KM = 1024$$

The number of sampling points of the data block in the time domain may be $(14 \times M + (K-1) \times M + M/2)$. In contrast, an OFDM data block (having 14 OFDM symbols) without CP having the same rate may include a total of $14 \times M$ time domain sampling points. By comparison it can be seen that the OQAM scheme has $(K-1) \times M + M/2$ more time domain sampling points. In the sampling points, $(K-1) \times M$ sampling points are a result of using a prototype filter waveform with KM sampling points, and M/2 sampling points are resulted from the delay in two IQ signals of the OQAM. Those sampling points may be regarded as the head and tail effect of OQAM. If $(K-1) \times M/2 + M/4$ sampling points are pruned from both the head and the tail of an OQAM data block, the head and tail effect of OQAM may be eliminated. But such pruning may generate significant influence on the waveform, especially the waveforms of OQAM symbols at the head and the tail of the data block, and impair the reception performances of the data block.

Figure 3A:
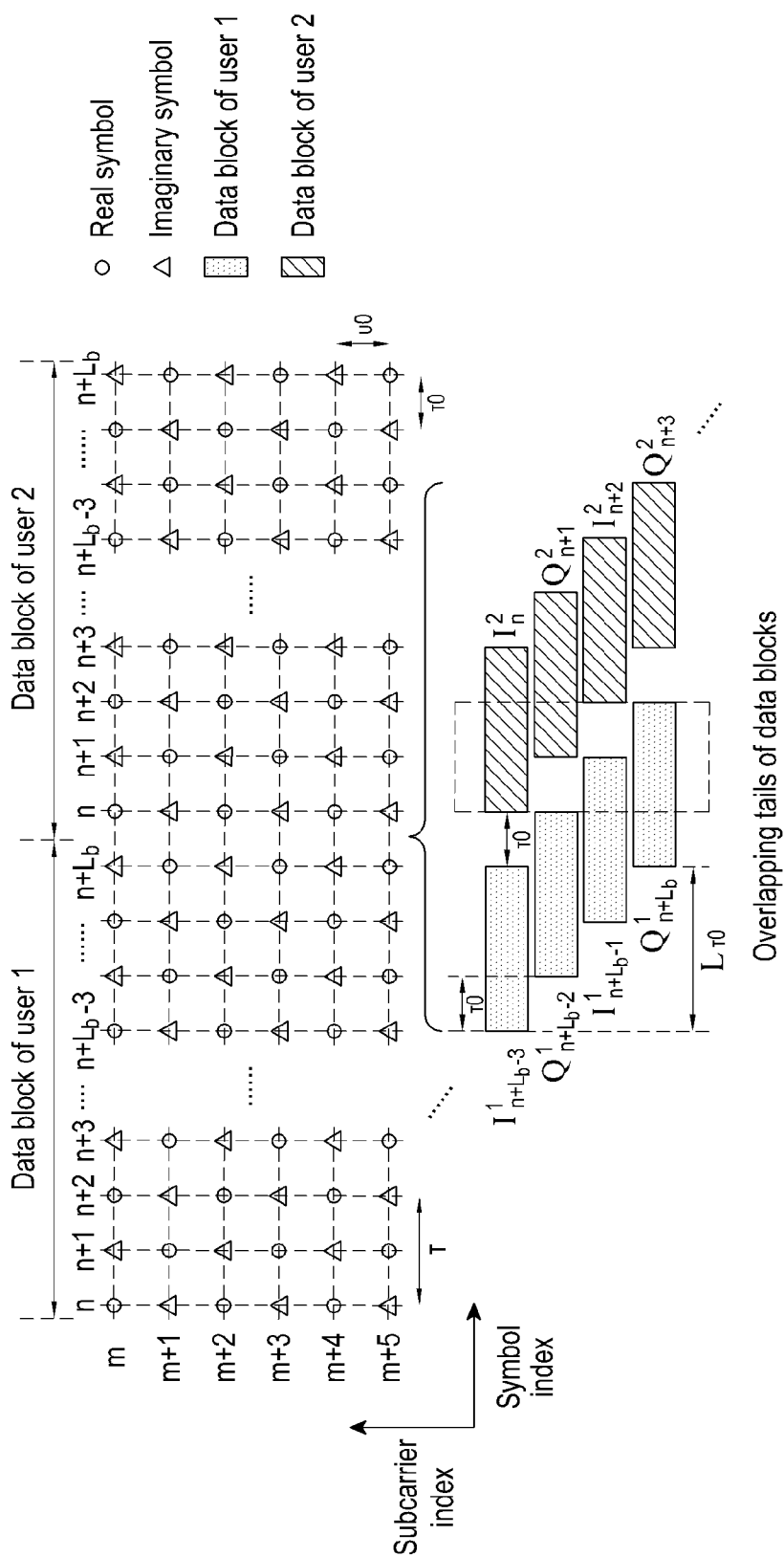
FIG. 3A illustrates a schematic diagram of a tail of a data block fully overlaps with a head of another data block in burst transmission of an FBMC/OQAM system according to an embodiment of the present disclosure.
Figure 3B:
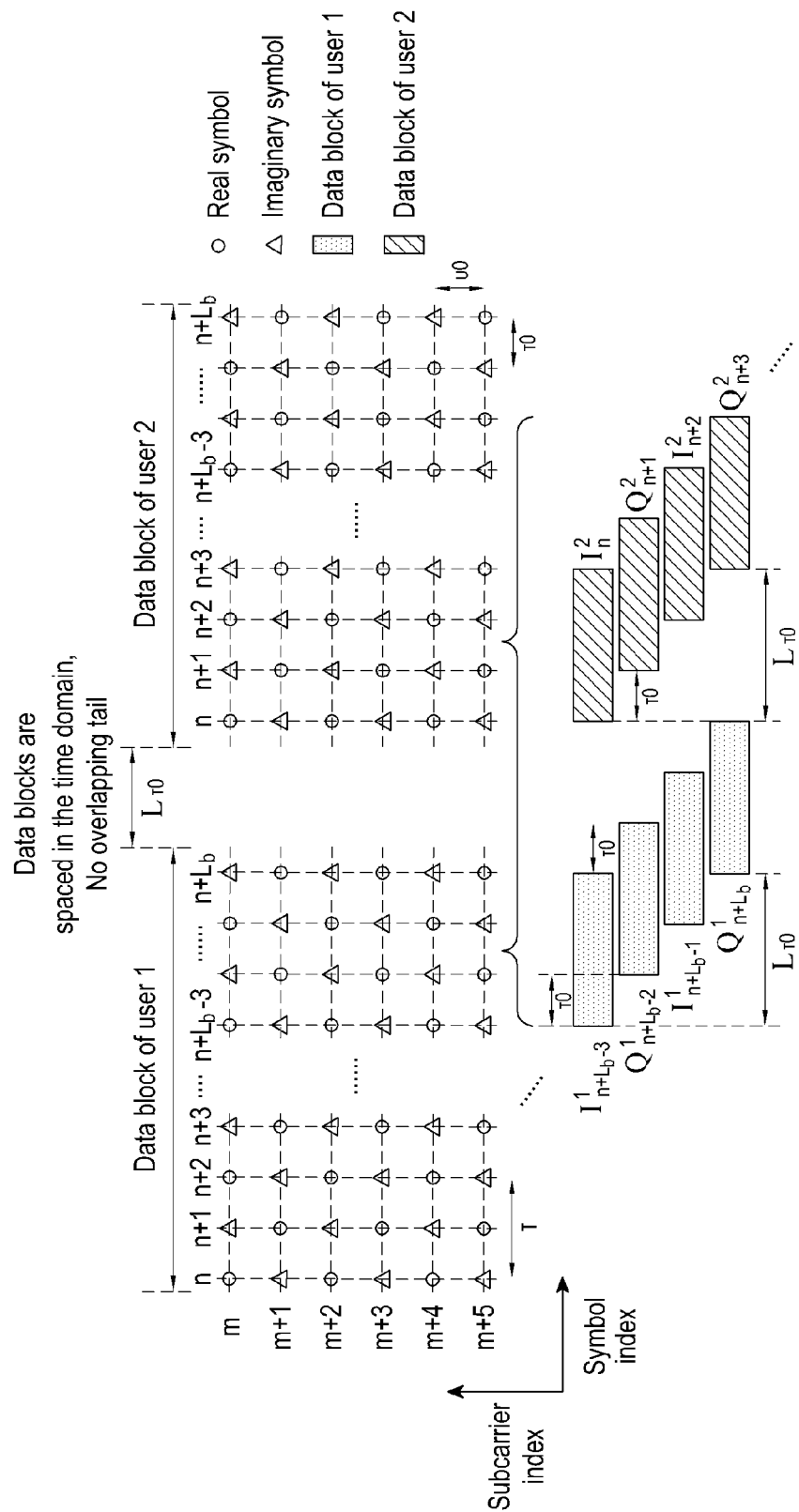
FIG. 3B illustrates a schematic diagram of a tail of a data block does not overlap with a head of another data block in burst transmission of an FBMC/OQAM system according to an embodiment of the present disclosure.
Figure 3C:
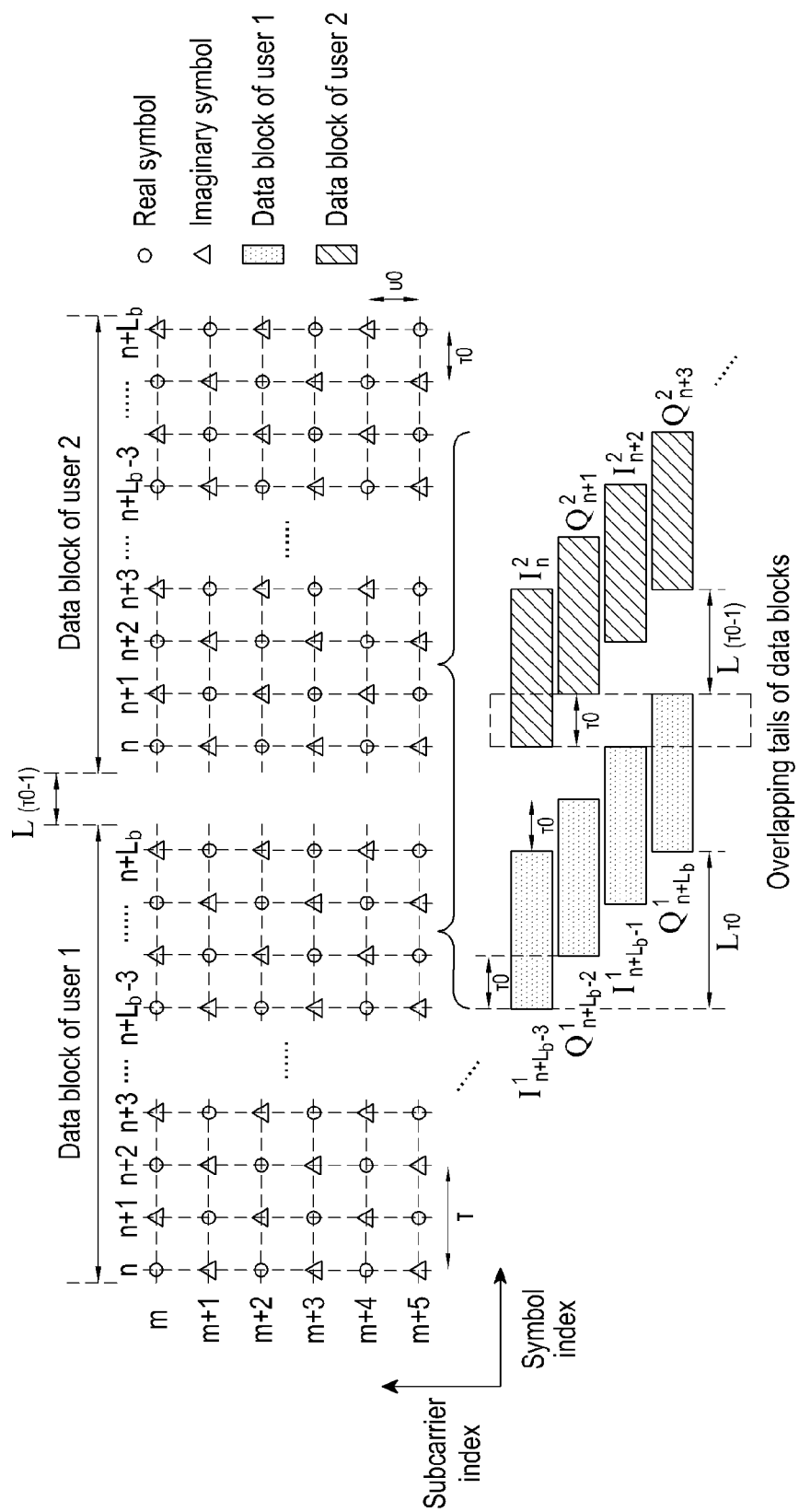
FIG. 3C illustrates a schematic diagram of a tail of a data block partially overlaps with a head of another data block in burst transmission of an FBMC/OQAM system according to an embodiment of the present disclosure.
Figure 3D:
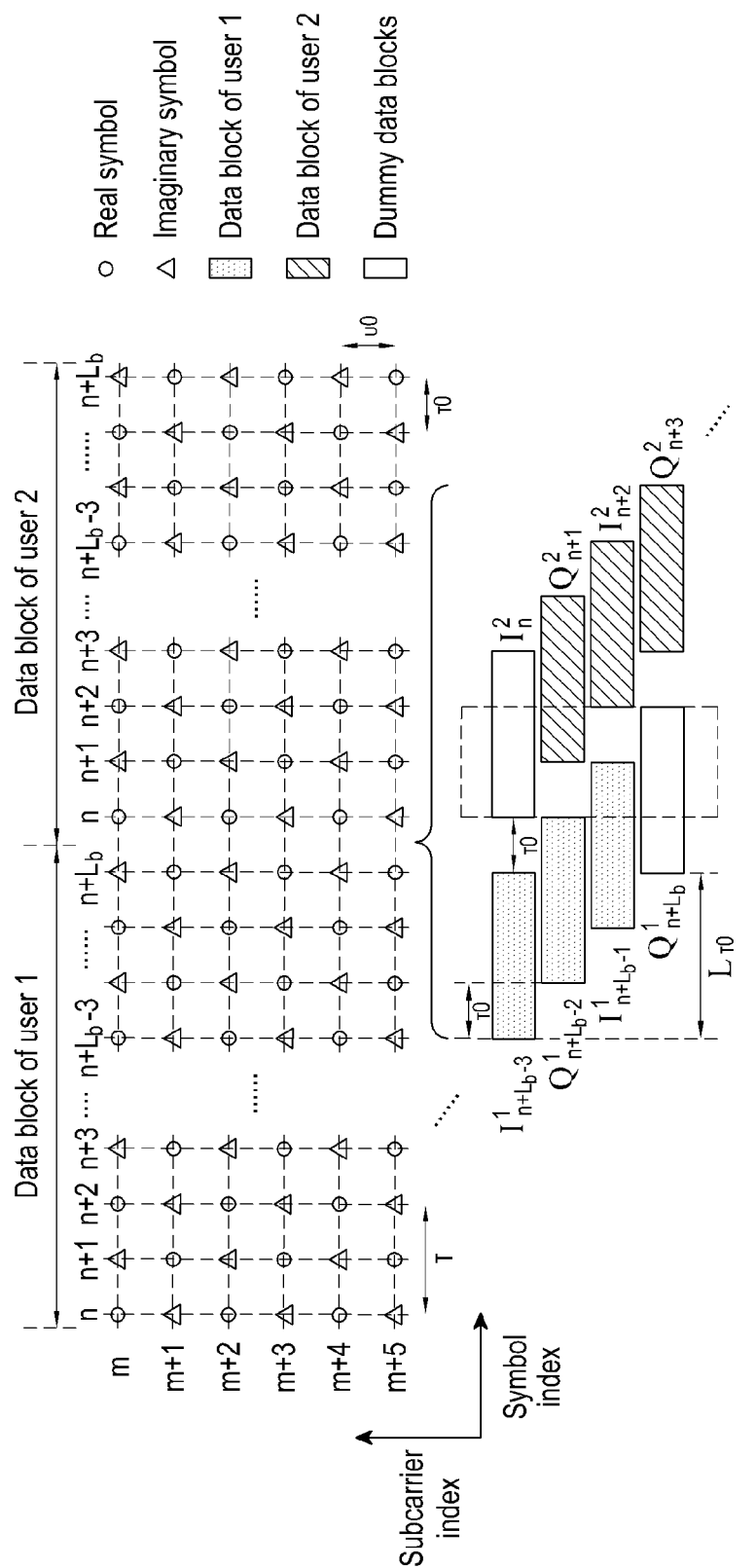
FIG. 3D illustrates another schematic diagram of a tail of a data block partially overlaps with a head of another data block in burst transmission of an FBMC/OQAM system according to an embodiment of the present disclosure.

FIG. 3A illustrates a tail of a first data block completely overlaps with a head of a second data block of a different user (e.g., the first data block may belong to user 1, the second data block may belong to user 2) in burst transmission in an FBMC/OQAM system. As shown in FIG. 3A, each user data block may include plural OQAM symbols and a tail having a length. It can be seen from FIG. 3A that the head and tail effect causes overlapping of waveforms of data blocks. If different user data blocks are continuously transmitted in the time domain, a tail of a first user data block may completely overlap with a head of a second user data block, and the interference is to be addressed. FIG. 3B illustrates a tail of a first user data block does not overlap with a head of a second user block. To achieve the effect of FIG. 3B, in an example, the number of OQAM symbols transmitted in each data block may be reduced, or, different user data blocks may be transmitted with a time interval which equals to the length of a tail, which may result in a waste of resources. FIGS. 3C and 3D illustrate a tail of a first user data block partially overlaps with a head of a second user data block, which may be taken into consideration in design of the solution. As shown in FIG. 3C, tail overlapping between different user data blocks may be reduced by transmitting the different user data blocks with a time interval in between. As shown in FIG. 3D, two OQAM symbols respectively at the head and the tail of each user data block may not be transmitted (or only dummy data is transmitted), and this can also reduce the tail overlapping between different user data blocks. But the methods as shown in FIGS. 3C and 3D may also result in wastes of resources.

Figure 4:
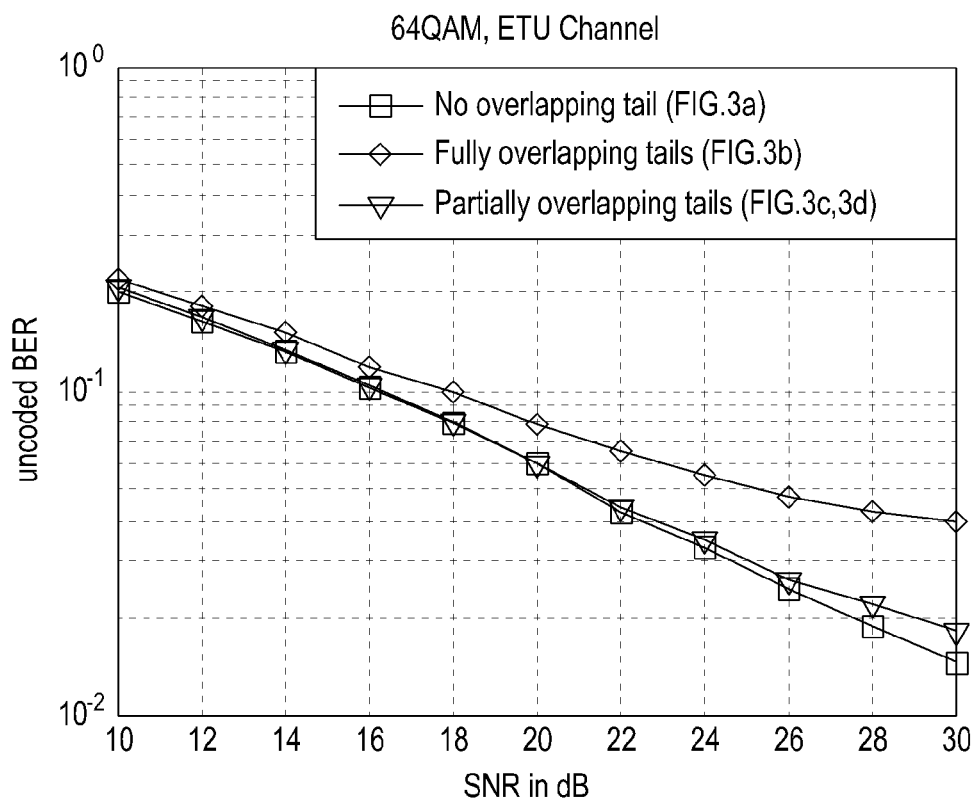
FIG. 4 illustrates a schematic diagram of simulation of the head and tail effect between data bursts in burst transmission of an FBMC/OQAM system according to an embodiment of the present disclosure.

FIG. 4 illustrates simulation results when there are complete overlapping, no overlapping and partial overlapping between different user data blocks in an FBMC/OQAM system. According to FIG. 4, the bit error rate (BER) when there is complete overlapping is significantly higher than the BER when there is no overlapping. In addition, the BER when there is partial overlapping (e.g., the method of leaving a vacant OQAM symbol both at the head and the tail of a data block as shown in FIG. 3D) is almost the same with the BER when there is complete overlapping. It can be concluded that the interference between data blocks generated by overlapping tails of different user data blocks is mainly resulted from the OQAM symbols respectively at the head and the tail of the data blocks. The OQAM symbols respectively at the head and the tail of the data blocks may be decoupled using the method shown in FIG. 3D to reduce the interference resulted from overlapping tails of data blocks, but resources may be wasted, especially in transmission of small packets.

To address some of the problems of the FBMC/OQAM system, various examples of the present disclosure provide a signal transmission and reception method in an FBMC/OQAM system to decouple the OQAM symbols at the head and the tail of the data blocks of different users while not reducing the data transmission efficiency which can avoid wasting resources.

Figure 5:
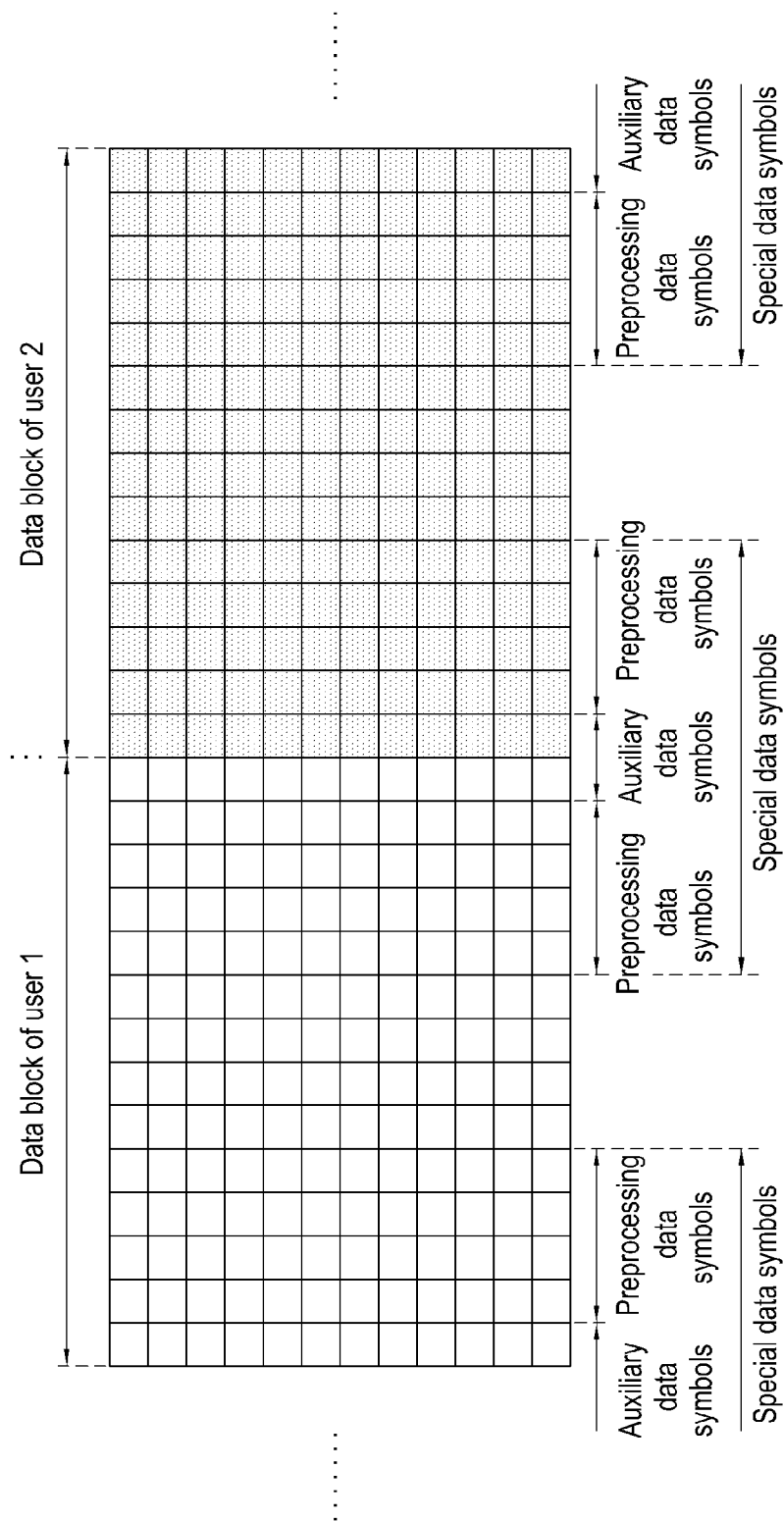
FIG. 5 illustrates a schematic diagram of the structure of a data block in an FBMC/OQAM system according to an embodiment of the present disclosure.

In an example, various examples provide a structure of data blocks and transmission and reception schemes based on the data block structure in an FBMC/OQAM system. FIG. 5 illustrates a schematic diagram of the structure of a data block in an FBMC/OQAM according to an embodiment of the present disclosure. In the user data block, category-1 data symbols (e.g., the special data symbols as shown in FIG. 5), category-2 data symbols (e.g., the auxiliary data symbols), and category-3 data symbols (e.g., the preprocessing data symbols as shown in FIG. 5) may be configured. In the following description, special data symbols, auxiliary data symbols and preprocessing data symbols are taken as an example of the three types of data symbols. The special data symbols may include one or plural OQAM symbols respectively at the head and the tail of a data block. In an example, the special data symbols may include the auxiliary data symbols and the preprocessing data symbols. As shown in FIG. 5, the auxiliary data symbols may include one or plural OQAM symbols respectively at the head and the tail of a data block. Accordingly, the preprocessing data symbols may be OQAM symbols other than the auxiliary data symbols in the special data symbols, as shown in FIG. 5. In an example, the auxiliary data symbols may be used for decoupling different user data blocks to eliminate interference between the different user data blocks. The preprocessing data symbols may be processed through preprocessing and/or precoding, so as to eliminate ISI and ICI in the data blocks while guaranteeing the data transmission efficiency.

In an example, in order to eliminate the interference between different user data blocks, a receiving device may not demodulate the auxiliary data symbols to avoid introducing inter-data block interference. Target data symbols of the auxiliary data symbols may be transmitted to the receiving device in a manner which not only eliminates the inter-data block interference but also does not reduce the data transmission efficiency. The target data symbols of the auxiliary data symbols refer to data that was to be transmitted in the auxiliary data symbols. In an example, by processing the preprocessing data symbols, a receiving device may be enabled to obtain target data symbols of the preprocessing data symbols and the target data symbols of the auxiliary data symbols by demodulating the preprocessing data symbols. As such, the data transmission efficiency can be kept unchanged.

The processing of the preprocessing data symbols may damage the orthogonality of the system and generate ICI and ISI within a data block. The preprocessing data symbols and the auxiliary data symbols may be designed properly to counteract the ICI and the ISI within the data block.

A transmitting device may determine actually transmitted data symbols of the auxiliary data symbols or actually transmitted data symbols of the preprocessing data symbols according to interference experienced by the preprocessing data symbols in the user data block from all of adjacent OQAM data symbols, so that the received preprocessing data symbols which is a composite of the actually transmitted data symbol and the interference include target data symbols of the preprocessing data symbols and target data symbols of the auxiliary data symbols. According to the mechanism, a receiving device is enabled to obtain the target data symbols of both the preprocessing data symbols and the auxiliary data symbols by demodulating the auxiliary data symbols.

In an example, the signal reception method of the receiving device may include:

receiving a user data block transmitted by a transmitting device, determining a type of a OQAM symbol currently being demodulated according to a position of the OQAM symbol in the user data block; if the OQAM symbol is an auxiliary data symbol, skipping the demodulation of the OQAM symbol; if the OQAM symbol is a preprocessing data symbol, demodulating the OQAM symbol to obtain a target data symbol of the preprocessing data symbol and a target data symbol of the auxiliary data symbol; if the OQAM symbol is neither an auxiliary data symbol nor a preprocessing data symbol, extracting a real part or an imaginary part of the OQAM symbol as a received data symbol.

The above is the overall signal transmission and reception method. The following examples provide two implementation methods respectively corresponding to different data block structures and related transmission and reception mechanisms. The mechanism of the present disclosure is hereinafter described in detail with reference to several examples. The following examples still takes the special data symbols as the category-2 data symbols, the auxiliary data symbols as the category-2 data symbols, and the preprocessing data symbols as the category-3 data symbols.

Example One

Figure 6:
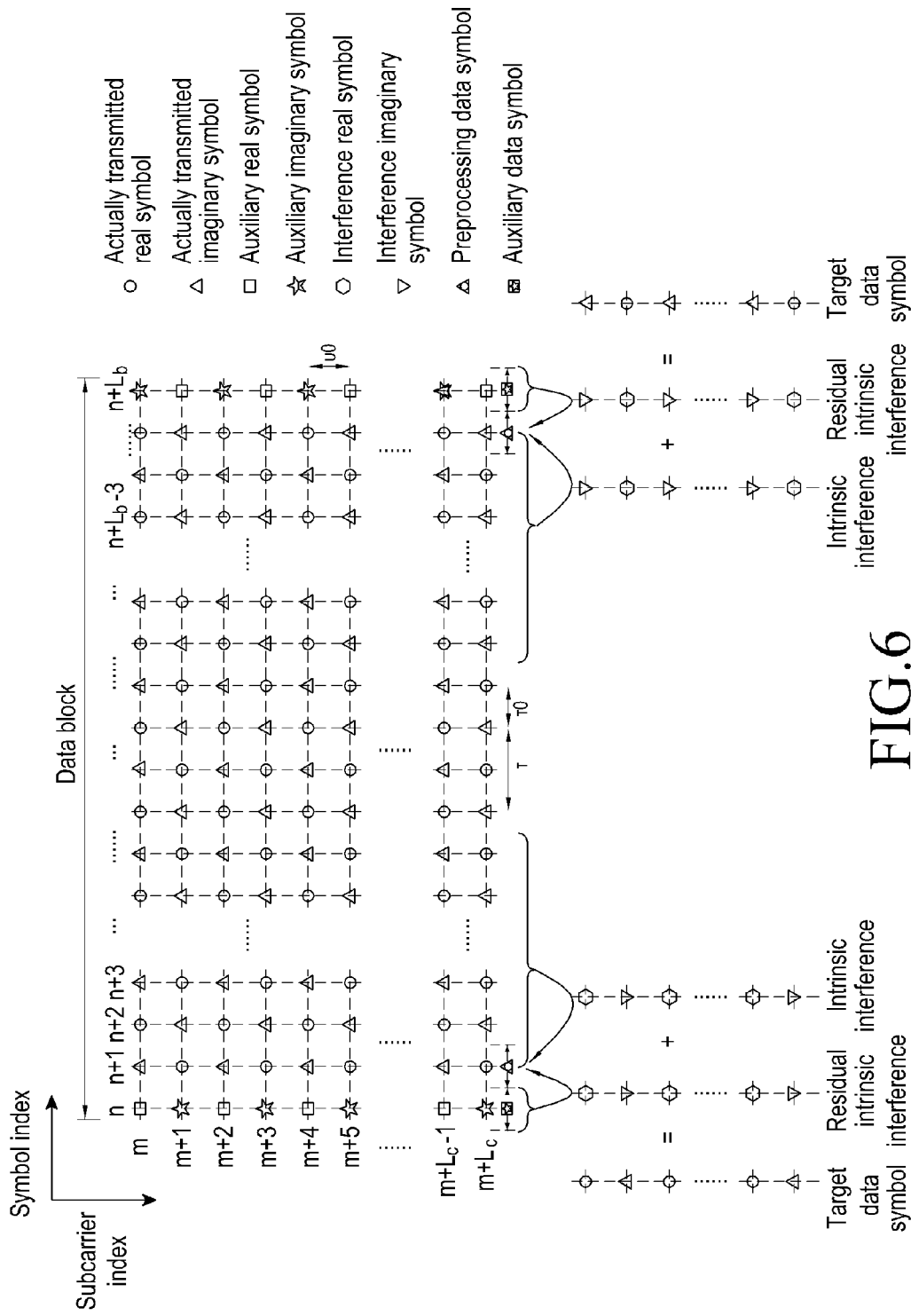
FIG. 6 illustrates a schematic diagram of the principle of constructing a data block in an FBMC/OQAM system according to an embodiment of the present disclosure.

FIG. 6 illustrates a schematic diagram of the structure of a data block of an FBMC/OQAM system according to an embodiment of the present disclosure. As shown in FIG. 6, auxiliary data symbols are the first OQAM symbol from the head of a data block and the first OQAM symbol from the tail of the data block, i.e., the n'th OQAM symbol and the n+$L_b$'th OQAM symbol as shown in FIG. 6. Preprocessing data symbols are the second OQAM symbol from the head of a data block and the second OQAM symbol from the tail of the data block, i.e., the n+1'th OQAM symbol and the n+$L_b$−1'th OQAM symbol as shown in FIG. 6. From the above it can be seen that signals of an OQAM system have orthogonal real parts. In a distortion-free channel, transmitted signals in which real parts and imaginary parts occur alternately may experience intrinsic interference at the receiving device from signals of adjacent symbols on adjacent subcarriers in which real parts and imaginary parts occur alternately in a different alternate manner. In example one, the actually transmitted data symbols (i.e., modulated symbols) of the preprocessing data symbols are the target data symbols of the preprocessing data symbols. The preprocessing data symbols received by the receiving device are a composite of the actually transmitted data symbols and interferences, equal to complex data symbols of the auxiliary data symbols which are a composite of target data symbols of the auxiliary data symbols and the actually transmitted data symbols of the preprocessing data symbols. The target data symbols of the auxiliary data symbols and the actually transmitted data symbols of the preprocessing data symbols serve as real parts and imaginary parts of the complex data symbols alternately. That is, in two preprocessing data symbols on two adjacent subcarriers, the real part of one preprocessing data symbol is an actually transmitted data symbol of the preprocessing data symbol, and the imaginary part is a target data symbol of the auxiliary data symbol; the real part of the other preprocessing data symbol is a target data symbol of the auxiliary data symbol, and the imaginary part is the actually transmitted data symbol of the preprocessing data symbol. As such, after receiving a preprocessing data symbol, the receiving device may extract the real part and the imaginary part of the preprocessing data symbol to obtain the actually transmitted data symbol of the preprocessing data symbol and the target data symbol of the auxiliary data symbol.

In an example, intrinsic interference experienced by the preprocessing data symbol from OQAM symbols excluding the auxiliary data symbol and intrinsic interference between subcarriers of the preprocessing data symbol may be calculated. Then, residual interference may be calculated based on the target data symbol of the auxiliary data symbol, and the auxiliary data symbol to be transmitted is calculated.

Figure 7:
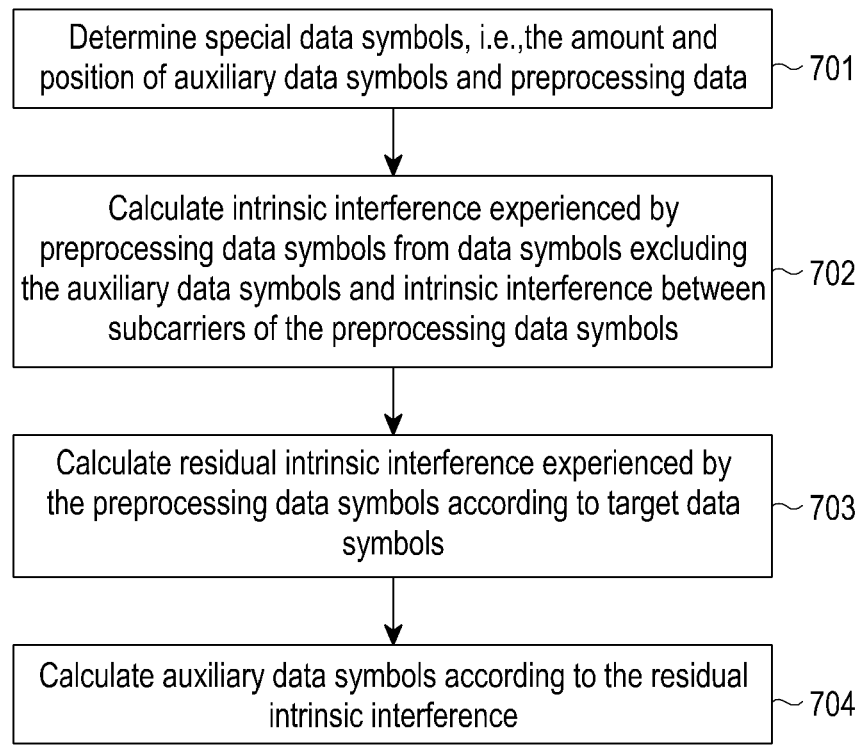
FIG. 7 illustrates a schematic diagram of a process of constructing a data block in an FBMC/OQAM system according to an embodiment of the present disclosure.
Figure 8:
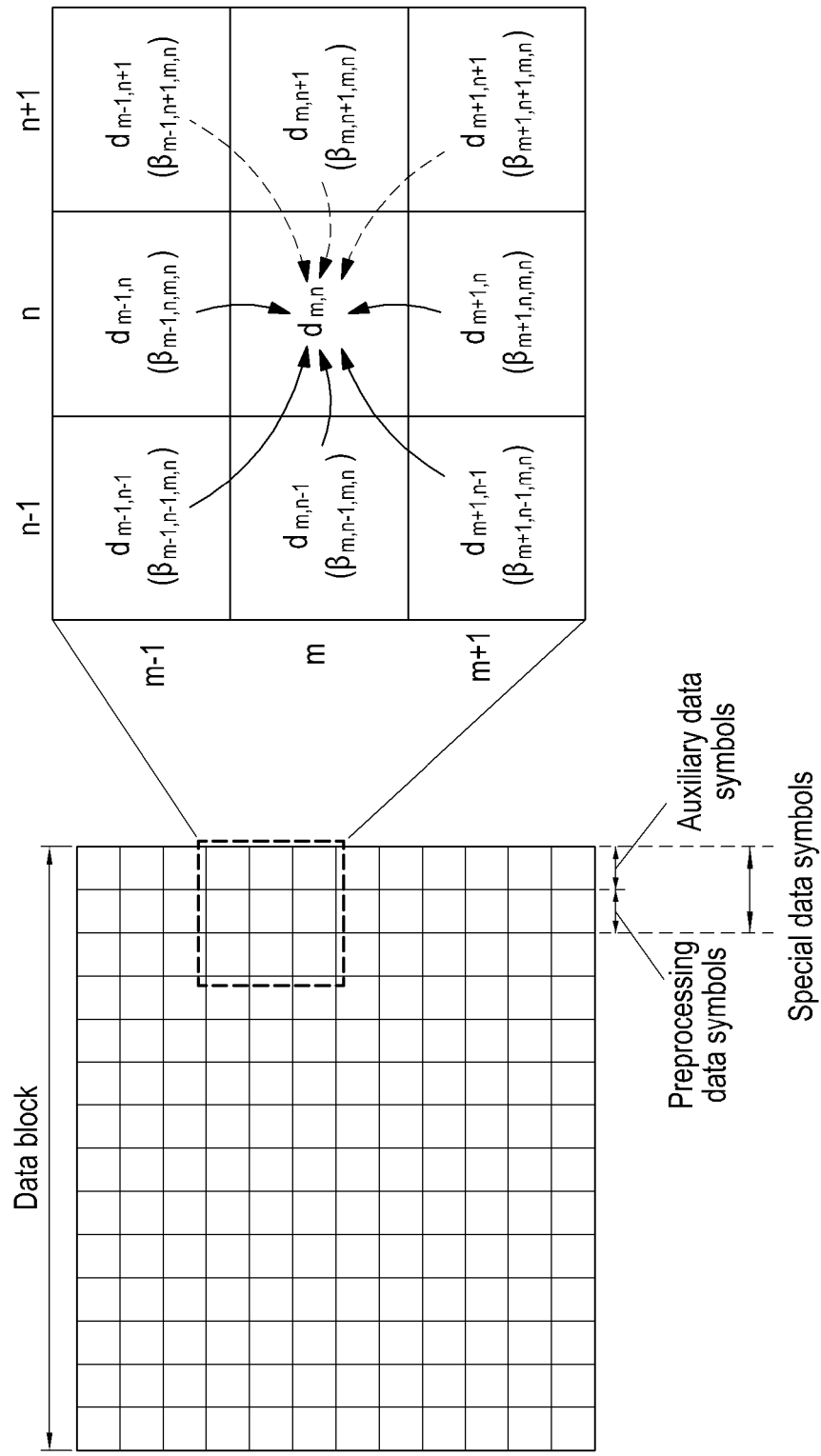
FIG. 8 illustrates a schematic diagram of calculations of interference in a data block in an FBMC/OQAM system according to an embodiment of the present disclosure.

FIG. 7 illustrates a flowchart of a method of determining a data block of an FBMC/OQAM system according to an embodiment of the present disclosure. FIG. 8 illustrates a schematic diagram of calculations of interference within a data block of an FBMC/OQAM system according to an embodiment of the present disclosure.

FIG. 7 and FIG. 8 are referred to in the following to illustrate the method of generating an auxiliary data symbol as shown in FIG. 6.

At block 701, special data symbols are determined. In an example, the number and the position of auxiliary data symbols and preprocessing data symbols in a data block are determined.

In example one, the auxiliary data symbols are the first OQAM symbol from the head of the data block and the first OQAM symbol from the tail of the data block. The preprocessing data symbols are the second OQAM symbol from the head of the data block and the second OQAM symbol from the tail of the data block.

The following takes calculations of the auxiliary data symbol located at the tail of the data block as an example.

At block 702, intrinsic interference experienced by a preprocessing data symbol from OQAM symbols excluding the auxiliary data symbol and intrinsic interference between subcarriers of the preprocessing data symbol may be calculated.

Supposing a modulated real signal at the (m,n)'th frequency-time point is $d_{m,n}$ (i.e., the actually transmitted data symbol of the preprocessing data symbol, which is known as original data to be transmitted by the transmitting device), the receiving device may obtain $x_{m,n}=d_{m,n}+j \cdot b_{m,n}$ at the (m,n)'th frequency-time point (assuming a distortion-free channel).

$$b_{m,n} = \sum_{(m',n') \in \mathbb{D}} \beta_{m',n',m,n} d_{m',n'} \qquad (10)$$

The (m',n') is the index of an adjacent frequency-time point of the (m,n)'th frequency-time point, $d_{m',n'}$ is a real symbol transmitted at the (m',n')'th frequency-time point, $\beta_{m',n',m,n}$ is an intrinsic interference coefficient from frequency-time point (m',n') to frequency-time point (m,n) under OQAM. The intrinsic interference coefficient may be determined by parameters of a prototype filter employed, and may be obtained through calculation or simulation which is not limited herein. $\mathbb{D}$ is a set of indices of all frequency-time points that causes interference to the frequency-time point (m,n).

FIG. 8 illustrates a schematic diagram of intrinsic interferences between frequency-time points in an FBMC/OQAM system, illustrating the above interferences. Referring to FIG. 8, the set $\mathbb{D}$ includes a total of 8 adjacent frequency-time points that may cause interference to the frequency-time point $d_{m,n}$. Based on the structure of the data block of example one as shown in FIG. 6, procedure in the block 702 may include calculating the intrinsic interference experienced by the preprocessing data symbol from OQAM symbols excluding the auxiliary data symbol and the intrinsic interference between subcarriers of the preprocessing data symbol. The intrinsic interferences are denoted by solid arrows in FIG. 8. It is assumed that the n'th OQAM symbol in the data block is a preprocessing data symbol, and the n+1'th OQAM symbol is an auxiliary data symbol. In an example, the interference experienced by the preprocessing data symbol from the auxiliary data symbol (denoted by dotted arrows in FIG. 8) may not be calculated at this block, and may be assumed to be zero. In an example, supposing $r_{m,n}$ is an equivalent complex signal composed at the (m,n)'th frequency-time point which includes original modulated data symbols, interference from data symbols excluding the auxiliary data symbol and self interference, when m is an even number:

$$r_{m,n} = \qquad (11)$$
$$d_{m,n} + j \cdot [\sum_{(m',n')} \beta_{m',n',m,n} d_{m',n'} + \beta_{m+1,n,m,n} d_{m+1,n} + \beta_{m-1,n,m,n} d_{m-1,n}]$$

or, when m is an odd number:

$$r_{m,n} = j \cdot d_{m,n} + [\sum_{(m',n') \in \mathcal{O}} \beta_{m',n',m,n} d_{m',n'} + \beta_{m+1,n,m,n} d_{m+1,n} + \beta_{m-1,n,m,n} d_{m-1,n}] \quad (12)$$

The $d_{m',n'}$ is a data signal at frequency-time point (m',n'), $\mathcal{O}$ is a set of indices of all frequency-time points that may cause interference to the frequency-time point (m,n), $\sum_{(m',n') \in \mathcal{O}} \beta_{m',n'} d_{m',n'}$ is the intrinsic interference experienced by the frequency-time point (m,n) from all of frequency-time points in $\mathcal{O}$, and $\beta_{m+1,n,m,n} d_{m+1,n} + \beta_{m-1,n,m,n} d_{m-1,n}$ is the self interference of the preprocessing data symbol, i.e., the intrinsic interference between subcarriers of the preprocessing data symbol.

At block 703, residual intrinsic interference that may be experienced by the preprocessing data symbols may be calculated based on target data symbol of the auxiliary data symbol.

As stated above, each subcarrier of the original modulated preprocessing data symbol may only transmit a real symbol or an imaginary symbol. After the intrinsic interference is calculated at block 702, the symbol transmitted in each subcarrier of the modulated preprocessing data symbol is converted to a complex signal $r_{m,n}$. Therefore, required information of the target data symbol of the auxiliary data symbol can be reconstructed on subcarriers of the preprocessing data symbol by constructing interference on subcarriers of the preprocessing data symbols. Since some of the intrinsic interferences have been obtained (calculated at block 702), only the residual intrinsic interference needs to be calculated.

$$I_{m,n} = \tilde{d}_{m,n} - r_{m,n} \quad (13)$$

The $I_{m,n}$ is the required residual intrinsic interference, $\tilde{d}_{m,n}$ is the target data symbol of the auxiliary data symbol, the $\tilde{d}_{m,n}$ and the actually transmitted data symbol $d_{m,n}$ of the preprocessing data symbol serve as the real part and the imaginary part alternately, i.e., when $d_{m,n}$ is real, $\tilde{d}_{m,n}$ is imaginary; when $d_{m,n}$ is imaginary, $\tilde{d}_{m,n}$ is real. Based on formulae (11) and (12), when m is an even number, the required residual intrinsic interference may be:

$$I_{m,n} = j \cdot \tilde{d}_{m,n} - j \cdot [\sum_{(m',n') \in \mathcal{O}} \beta_{m',n',m,n} d_{m',n'} + \beta_{m+1,n,m,n} d_{m+1,n} + \beta_{m-1,n,m,n} d_{m-1,n}] \quad (14)$$

when m is an odd number, the required residual intrinsic interference may be:

$$I_{m,n} = \tilde{d}_{m,n} - [\sum_{(m',n') \in \mathcal{O}} \beta_{m',n',m,n} d_{m',n'} + \beta_{m+1,n,m,n} d_{m+1,n} + \beta_{m-1,n,m,n} d_{m-1,n}] \quad (15)$$

At block 704, the auxiliary data symbol may be calculated according to the residual intrinsic interference.

In example one, $I_{m,n}$ is generated using the auxiliary data symbol. According to FIG. 6, a set of auxiliary data symbols may be defined as $\bar{a} = [a_{0,n+1}, a_{1,n+1}, \ldots, a_{M-1,n+1}]^T$, the interference caused by the set to the preprocessing data symbol may be:

$$\begin{bmatrix} e_{0,n} \\ e_{1,n} \\ \vdots \\ e_{M-1,n} \end{bmatrix} = \underbrace{\begin{bmatrix} \beta_{0,n+1,0,n} & \beta_{1,n+1,0,n} & 0 & \cdots & 0 \\ \beta_{0,n+1,1,n} & \beta_{1,n+1,1,n} & \beta_{2,n+1,1,n} & \cdots & 0 \\ \vdots & \vdots & \vdots & \ddots & \vdots \\ 0 & 0 & 0 & \cdots & \beta_{M-1,n+1,M-1,n} \end{bmatrix}}_{\Upsilon} \begin{bmatrix} a_{0,n+1} \\ a_{1,n+1} \\ \vdots \\ a_{M-1,n+1} \end{bmatrix} \quad (16)$$

The $[e_{0,n}, e_{1,n}, \ldots, e_{M-1,n}]^T$ is the interference caused by the auxiliary data symbol to the preprocessing data symbol. Therefore, if m is an even number, $e_{m,n} = \Im\{I_{m,n}\}$; if m is an odd number, $e_{m,n} = \Re\{I_{m,n}\}$, and it may be obtained through calculations that:

$$\begin{bmatrix} a_{0,n+1} \\ a_{1,n+1} \\ \vdots \\ a_{M-1,n+1} \end{bmatrix} = \Upsilon^{-1} \begin{bmatrix} e_{0,n} \\ e_{1,n} \\ \vdots \\ e_{M-1,n} \end{bmatrix} \quad (17)$$

It can be seen that when the values of the auxiliary data symbols satisfy the formula (17), a composite complex vector generated at each subcarrier of the preprocessing data symbol may equal to a complex composite of the target data symbol vector and the original data symbol vector. The above is about the auxiliary data symbol and the preprocessing data symbol at the tail of the data block. Processing of the auxiliary data symbol and the preprocessing data symbol at the head of the data block may be carried out in a similar manner, thus is not elaborated herein.

In view of the foregoing, in example one, the auxiliary data symbols are the first OQAM symbol from the head of the user data block and the first OQAM symbol from the tail of the user data block, the preprocessing data symbols are the second OQAM symbol from the head of the user data block and the second OQAM symbol from the tail of the user data block. The actually transmitted data symbols of the preprocessing data symbols are target data symbols of the preprocessing data symbols, i.e., the original modulated data. The actually transmitted data symbols of the auxiliary data symbols are calculated using the actually transmitted data symbols of the preprocessing data symbols, intrinsic interference experienced by the preprocessing data symbols from adjacent OQAM symbols excluding the auxiliary data symbols and the preprocessing data symbols in the user data block, self interference between subcarriers of the preprocessing data symbols and intrinsic interference coefficients from the auxiliary data symbols to the preprocessing data symbols, so that the preprocessing data symbols which is a composite of the actually transmitted data symbols, intrinsic interference and self interference equal to complex data symbols which is a composite of target data symbols of the auxiliary data symbols and the actually transmitted data symbols of the preprocessing data symbols.

In an example, the method of calculating the actually transmitted data symbols of the auxiliary data symbols may include:

calculating, intrinsic interference experienced by a preprocessing data symbol A, which is any of preprocessing data symbols, from adjacent OQAM symbols excluding the auxiliary data symbols and the preprocessing data symbols, calculating self interference experienced by the preprocessing data symbol A from preprocessing data symbols on adjacent subcarriers in the same time slot; calculating the sum B of the intrinsic interference and the self interference and the preprocessing data symbol A, and calculating the difference between the target data symbols and B;

processing the difference. In an example, when the actually transmitted data symbol of the preprocessing data symbol A is real, the imaginary part of the difference is determined to be the residual intrinsic interference of the preprocessing data symbol A. When the actually transmitted data symbol of the preprocessing data symbol A is imaginary, the real part of the difference is determined to be the residual intrinsic interference of the preprocessing data symbol A.

The residual intrinsic interference of all of preprocessing data symbols are calculated respectively according to the above method, and all of the residual intrinsic interference are combined to be residual intrinsic interference of a preprocessing data symbol vector. The residual intrinsic interference of the preprocessing data symbol vector may be determined to be the interference experienced by the preprocessing data symbol vector from an auxiliary data symbol vector. The actually transmitted data symbols of the auxiliary data symbols are calculated respectively by using the interference and intrinsic interference coefficients (e.g., the above matrix Y) from the auxiliary data symbol vector to the preprocessing data symbol vector. The auxiliary data symbol vector is a set of auxiliary data symbols of the auxiliary data symbols, and the preprocessing data symbol vector is a set of all of preprocessing data symbols in the user data block.

Figure 9:
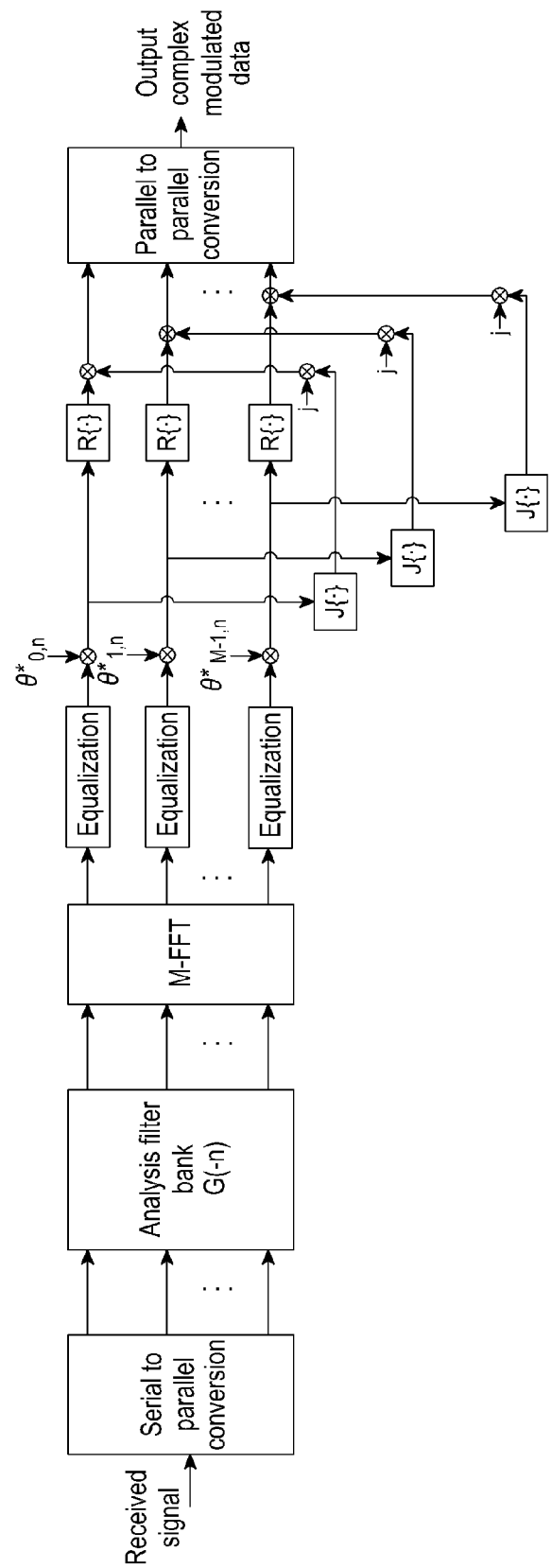
FIG. 9 illustrates a schematic diagram of reception and demodulation of preprocessing data symbols according to an embodiment of the present disclosure.
Figure 10:
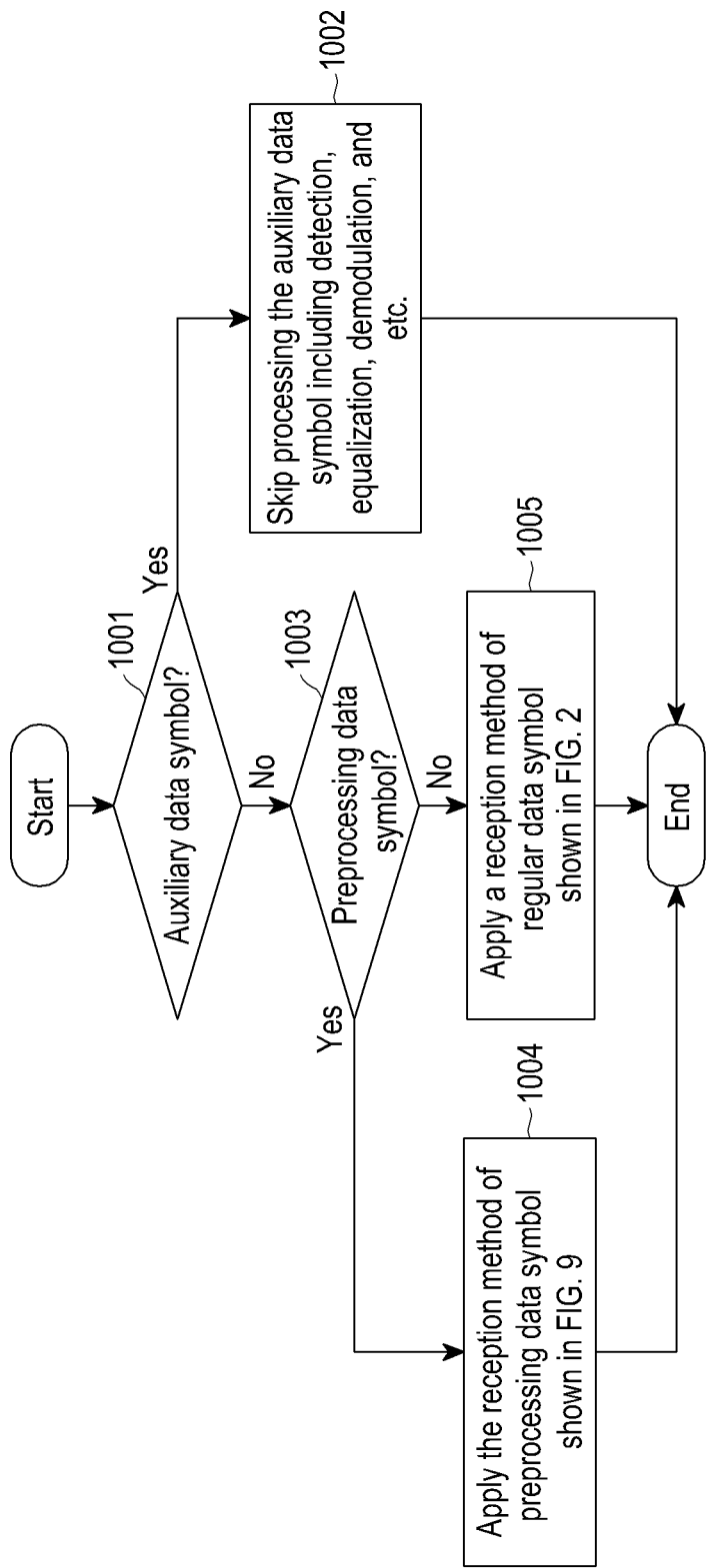
FIG. 10 illustrates a schematic diagram of reception and demodulation of a data block in an FBMC/OQAM system according to an embodiment of the present disclosure.

In example one, the receiving device may process the preprocessing data symbols according to the OQAM demodulation method as shown in FIG. 9. Different from the conventional OQAM demodulation method as shown in FIG. 2 which extracts the real part and the imaginary part of a received OQAM symbol, the demodulation method shown in FIG. 9 extracts a real part and an imaginary part of a received preprocessing data symbol, combines the real part and the imaginary part into a complex symbol to recover the target complex modulated data. Referring to FIG. 10, a demodulation process performed by a receiving device of example one may include the following procedures.

At block 1001, a receiving device determines whether a received OQAM symbol is an auxiliary data symbol according to known data block configurations. The data block configurations may include information about the number and the positions of special data symbols, auxiliary data symbols and preprocessing data symbols within a data block. The configurations may be generated by a transmitting device or a receiving device which transmits the configurations to the communication counterpart via control signaling, so that the transmitting device and the receiving device adopt the same data block configurations in one transmission.

At block 1002, in response to a determination that the received data symbol is an auxiliary data symbol, the receiving device may not perform operations including detection, channel equalization, demodulation, etc. on the auxiliary data symbol.

At block 1003, if the received data symbol is not an auxiliary data symbol, the receiving device may determine whether the received data symbol is a preprocessing data symbol according to the data block configurations.

At block 1004, in response to a determination that the received data symbol is a preprocessing data symbol, the receiving device may perform operations such as detection, channel equalization, demodulation, etc., on the received data symbol according to the reception method for preprocessing data symbols as shown in FIG. 9.

In an example, the real part and the imaginary part of the preprocessing data symbol may be extracted, and determined to be two individual data symbols, i.e., a target data symbol of the preprocessing data symbol and a target data symbol of an auxiliary data symbol. An extracted part that has the different real-imaginary effect from that of an adjacent OQAM symbol in the time domain is a target data symbol of the preprocessing data symbol, and the other extracted part that has the same real-imaginary effect with the adjacent OQAM symbol in the time domain is a target data symbol of the auxiliary data symbol. For example, if the real symbol is extracted from $y_{m,n-1}$, the real part extracted from preprocessing data symbol $y_{m,n}$ is the target data symbol of the auxiliary data symbol, and the imaginary part of); $y_{m,n}$ is the target data symbol of the preprocessing data symbol.

At block 1005, if the received data symbol is not a special data symbol, i.e., neither an auxiliary data symbol nor a preprocessing data symbol, the receiving device may perform processing, e.g., detection, channel equalization, demodulation, etc., on the received symbol using the method of receiving a regular data symbol as shown in FIG. 2.

In an example, the real part or the imaginary part of the preprocessing data symbol may be extracted as a data symbol.

Figure 11:
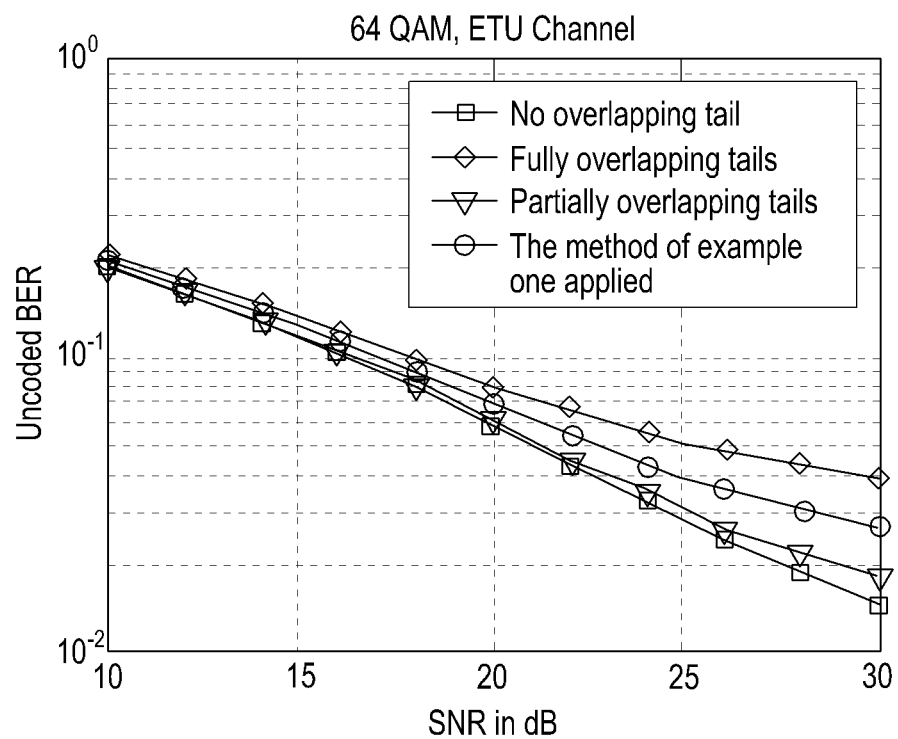
FIG. 11 illustrates a schematic diagram of simulation of tail effect of a data block in an FBMC/OQAM system according to an embodiment of the present disclosure.

FIG. 11 illustrates a schematic diagram of a simulation result of the method of example one according to an embodiment of the present disclosure. According to the simulation result, the method of example one can reduce the interference between data blocks resulted from a tail of a data block overlapping with a head of another data block. That is, data blocks are decoupled to avoid interference between data blocks by not demodulating the auxiliary data symbols at the head and the tail of the data blocks. In addition, data transmission efficiency and spectrum efficiency of the system will not be reduced while interference between data blocks is avoided by properly designing the special data symbols and performing proper operations at the receiving device.

Example Two

Figure 12:
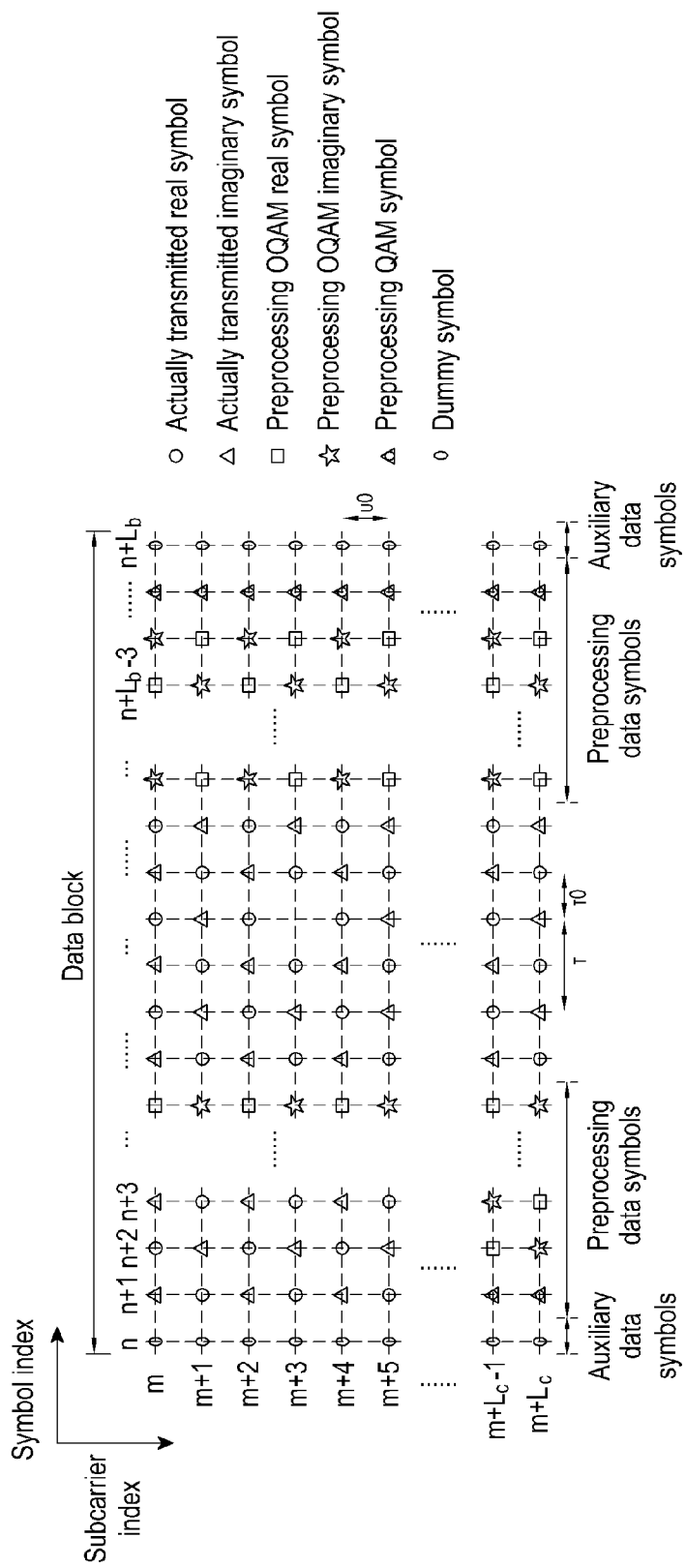
FIG. 12 illustrates a schematic diagram of the principle of constructing a data block in an FBMC/OQAM system according to an embodiment of the present disclosure.

The data block design, transmission method and reception method in an FBMC/OQAM system of example one can effectively reduce the interference due to a tail of a data block overlapping with a head of another data block while not reducing the data transmission efficiency. In order to construct the residual intrinsic interference in each subcarrier of a preprocessing data symbol, example one may amplify the transmission power of an auxiliary data symbol. Since auxiliary data symbols include two OQAM symbols respectively at the head and the tail of the data block according to example one, not demodulating the auxiliary data symbols can remarkably reduce the interference caused by the tail of a data block overlapping with a head of another data block. The increased transmission power of the auxiliary data symbols, however, may result in increased interference to other data symbols in the data block which impacts the system performances. To address the above issue, FIG. 12 illustrates a schematic diagram of the structure of a data block of an FBMC/OQAM system according to an embodiment of the present disclosure. As shown in FIG. 12, auxiliary data symbols are the first OQAM symbol from the head of a data block and the first OQAM symbol from the tail of the data block, i.e., the 'th OQAM symbol and the 'th OQAM symbol as shown in FIG. 12. Different from example two, the auxiliary data symbols of example two are set to be zero, i.e., only dummy symbols are transmitted in each subcarrier of the auxiliary data symbols. The preprocessing data symbols are one or plural OQAM symbols at both the head and the tail of a data block, as shown in FIG. 12. The preprocessing data symbols may include preprocessing QAM symbols (referred to as category-3 QAM symbols) and preprocessing OQAM symbols (referred to as category-3 OQAM symbols). The preprocessing QAM symbols are the second OQAM symbol from the head of a data block and the second OQAM symbol from the tail of the data block, i.e., the 'th OQAM symbol and the 'th OQAM symbol as shown in FIG. 12. The actually transmitted data symbols (i.e., modulated symbols) in each subcarrier of the preprocessing QAM symbols are complex data symbols. The preprocessing OQAM symbols are OQAM symbols in the preprocessing data symbols excluding the QAM symbols. A real symbol or an imaginary symbol may be transmitted in each subcarrier of the preprocessing OQAM symbols. Since signals of an OQAM system are orthogonal to each other in the real domain, i.e., transmitted signals in which real parts and imaginary parts occur alternately suffer from intrinsic interference from signals of adjacent symbols on adjacent subcarriers in which real parts and imaginary parts occur alternately in a different alternate manner even in a distortion-free channel. Therefore, in example two, by properly designing the actually transmitted data symbols of the preprocessing QAM symbols and that of the preprocessing OQAM symbols, the preprocessing OQAM symbols including interference received by the receiving device (i.e., the preprocessing OQAM symbols received by the receiving device irrespectively of channel interference) equal to the target data symbols of the preprocessing OQAM symbols, and the preprocessing QAM symbols including interference received by the receiving device (i.e., the preprocessing QAM symbols received by the receiving device irrespectively of channel interference) include real parts which equal to the target data symbols of the preprocessing QAM symbols and imaginary parts which equal to the target data symbols of the auxiliary data symbols.

In an example, an intrinsic interference correlation matrix between subcarriers of the preprocessing QAM symbols and that of the preprocessing OQAM symbols may be calculated. Given the preprocessing QAM symbols, the preprocessing OQAM symbols and auxiliary data symbols, the preprocessing data symbols to be transmitted may be calculated.

Figure 13:
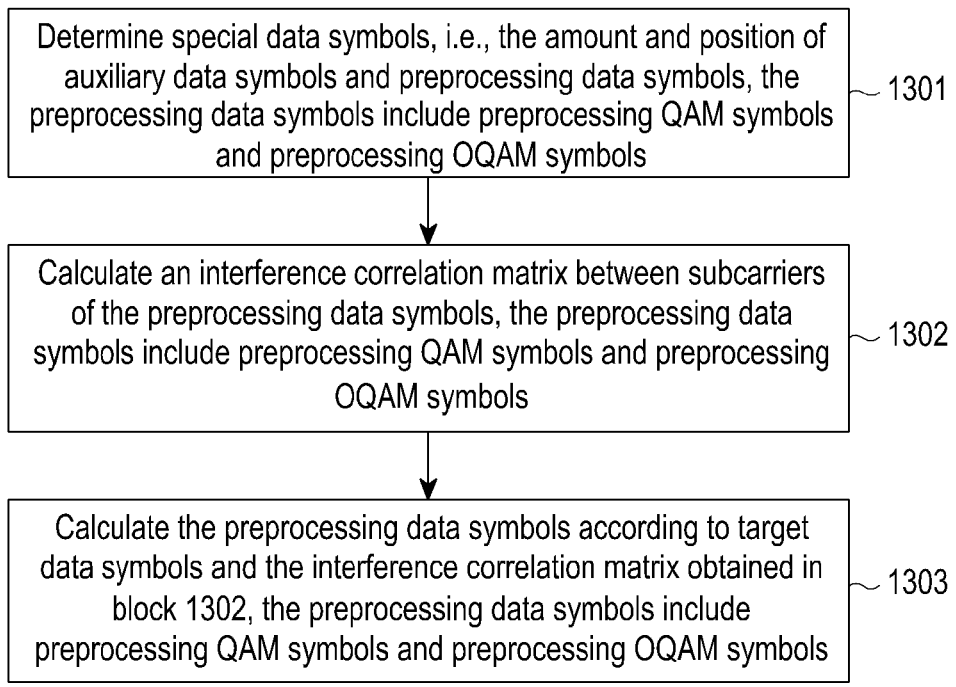
FIG. 13 illustrates a schematic diagram of a process of constructing a data block in an FBMC/OQAM system according to an embodiment of the present disclosure.
Figure 14:
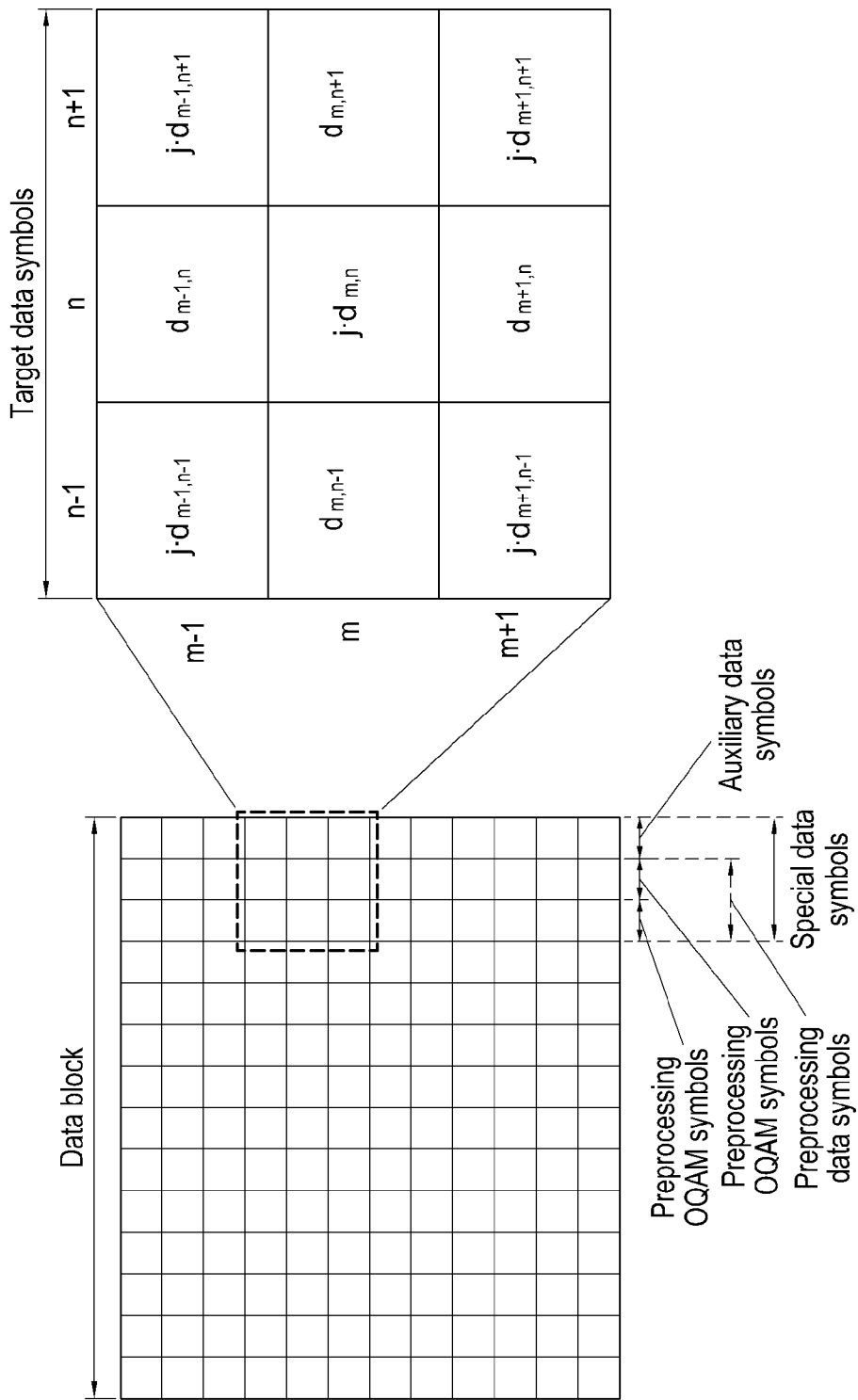
FIG. 14 illustrates a schematic diagram of target data symbols of a data block in an FBMC/OQAM system according to an embodiment of the present disclosure.
Figure 15:
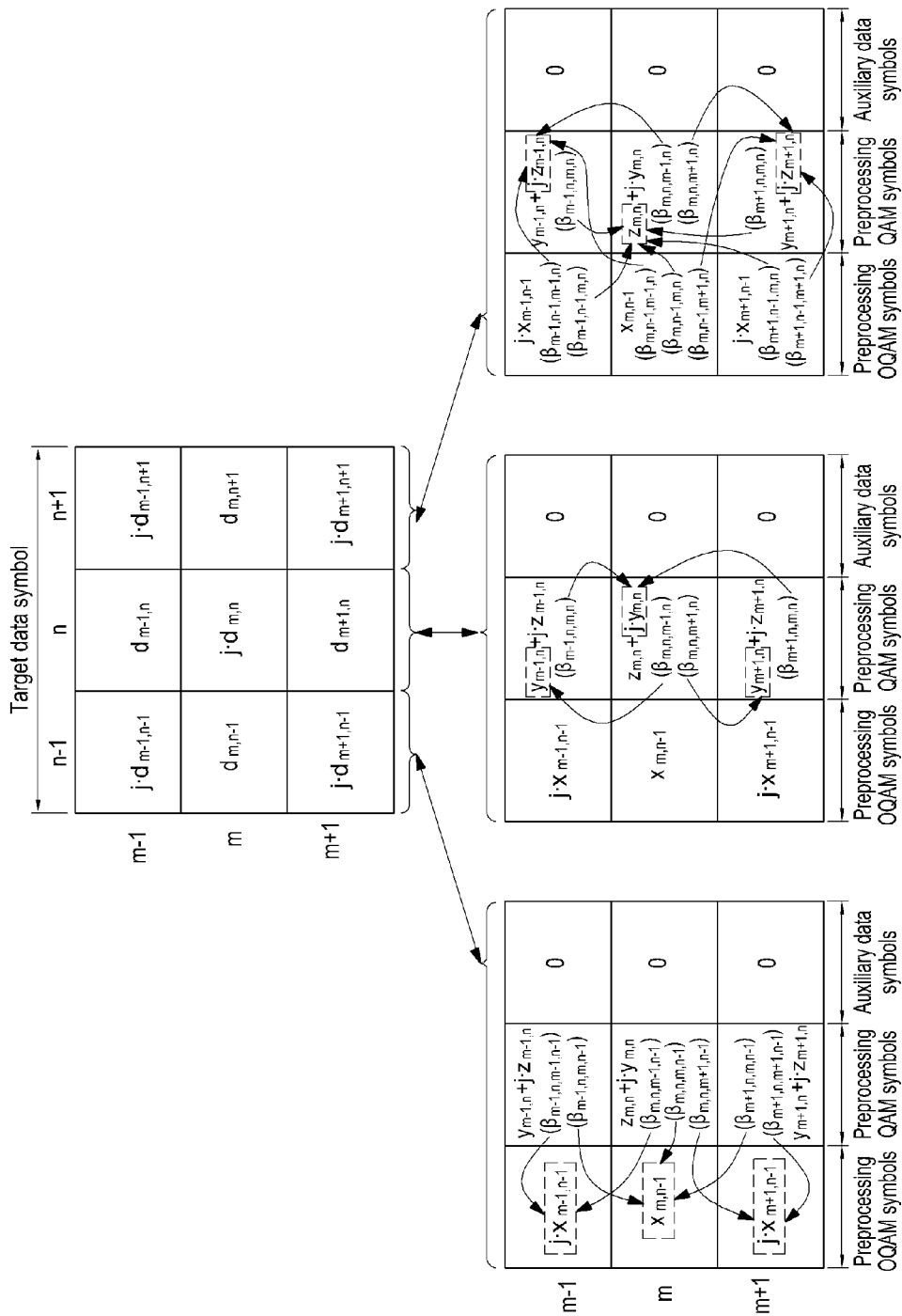
FIG. 15 illustrates a schematic diagram of calculations of an intrinsic interference correlation matrix based on a data block in an FBMC/OQAM system according to an embodiment of the present disclosure.

FIG. 13 illustrates a flowchart of a method of determining a data block of an FBMC/OQAM system according to an embodiment of the present disclosure. FIG. 14 illustrates a schematic diagram of target data symbols of a data block of an FBMC/OQAM system according to an embodiment of the present disclosure. FIG. 15 illustrates a schematic diagram illustrating calculations of intrinsic interference correlation matrix between preprocessing data symbols within a data block of an FBMC/OQAM system according to an embodiment of the present disclosure.

FIGS. 13, 14 and 15 are referred to in the following to illustrate the method of generating preprocessing data symbols (including preprocessing QAM symbols and OQAM symbols) as shown in FIG. 12.

At block 1301, special data symbols are determined. In an example, the number and the position of auxiliary data symbols and preprocessing data symbols (including preprocessing QAM symbols and OQAM symbols) in a data block are determined.

As stated above, the auxiliary data symbols of example two are the first OQAM symbol from the head of the data block and the first OQAM symbol from the tail of the data block, and are set to be zeros. The preprocessing data symbols are one or plural OQAM symbols at both the head and the tail of a data block excluding the auxiliary data symbols. According to example two, the number and position of OQAM symbols serving as the preprocessing data symbols may be configured by the transmitting device or the receiving device. In an example, the preprocessing QAM symbols are one OQAM symbol at the head of the preprocessing data symbols and one OQAM symbol at the tail of the preprocessing data symbols. In example two, complex data symbols are transmitted in subcarriers of the preprocessing OQAM symbols. The preprocessing OQAM symbols are OQAM symbols in the preprocessing data symbols excluding the preprocessing QAM symbols. PAM (pulse amplitude modulation) signals (which are real symbols) may be transmitted in each subcarrier of the preprocessing OQAM symbols.

At block 1302, preprocessing data symbols are calculated. In an example, an intrinsic interference correlation matrix between subcarriers of preprocessing QAM symbols and of preprocessing OQAM symbols are calculated.

FIG. 14 illustrates a schematic diagram of the structure of a data block in an FBMC/OQAM system according to an embodiment of the present disclosure. As shown in FIG. 14, the illustrated auxiliary data symbol is the first OQAM symbol from the tail of the data block, i.e., the n+1'th OQAM symbol. The preprocessing data symbols are the second OQAM symbol from the head of a data block and the second OQAM symbol from the tail of the data block, i.e., the n'th OQAM symbol and the n−1'th OQAM symbol. In view of the foregoing, the preprocessing QAM symbol is the n'th OQAM symbol, and the preprocessing OQAM symbol is the n−1'th OQAM symbol. In order to simplify description, the following takes a preprocessing data symbol including two OQAM symbols as an example. The method of example two may be easily applied to situations in which the preprocessing data symbol includes more than two OQAM symbols. FIG. 14 also illustrates target data symbol vectors of preprocessing OQAM symbols, preprocessing QAM symbols and auxiliary data symbols, i.e., $\bar{d}_{n-1}=[j \cdot d_{0,n-1}, d_{1,n-1}, \ldots, d_{M-1,n-1}]^T$, $\bar{d}_n=[d_{0,n}, j \cdot d_{1,n}, \ldots, j \cdot d_{M-1,n}]^T$, and $\bar{d}_{n+1}=[j \cdot d_{0,n+1}, d_{1,n+1}, \ldots, d_{M-1,n+1}]^T$.

In example two, complex data symbols are transmitted in subcarriers of the preprocessing QAM symbols, thus there may be uplink/downlink interference between subcarriers of the preprocessing data symbols, as shown in FIG. 15. It may be assumed that $\bar{x}=[\bar{x}[0], \bar{x}[1], \ldots, \bar{x}[M-1]]^T = [j \cdot x_{0,n-1}, x_{1,n-1}, \ldots, x_{M-1,n-1}]^T$ is a set of preprocessing OQAM symbols, and $\overline{yz}=[y_{0,n}+j \cdot z_{0,n}, z_{1,n}+j \cdot y_{1,n}, \ldots, z_{M-1,n}+j \cdot y_{M-1,n}]^T$ is a set of reprocessing QAM symbols. Referring to FIG. 15, besides intrinsic interference from OQAM symbols excluding the preprocessing QAM symbols and from real parts and imaginary parts of the preprocessing OQAM symbols, subcarriers of the preprocessing OQAM symbols may experience interference from real parts and imaginary parts of subcarriers of the preprocessing QAM symbols. Supposing $r_{m,n-1}$ is an equivalent complex signal composed at the (m,n−1)'th frequency-time point in the preprocessing OQAM symbols, which include original modulated data symbols and interferences, when m is an even number:

$$r_{m,n-1} = \underbrace{x_{m,n-1} + \sum_{m'=0}^{M-1} \beta_{m',n,m,n-1} z_{m',n}}_{\Lambda_{m,n-1}} + \tag{18}$$

$$j \cdot \left[ \underbrace{\sum_{m'=0}^{M-1} \beta_{m',n,m,n-1} y_{m',n}}_{\phi_{m,n-1}} + \underbrace{\sum_{m',n'} \beta_{m',n',m,n-1} d_{m',n'}}_{\psi_{m,n-1}} + \underbrace{\beta_{m+1,n-1,m,n-1} x_{m+1,n-1} + \beta_{m-1,n-1,m,n-1} x_{m-1,n-1}}_{\Xi_{m,n-1}} \right]$$

or, when m is an odd number:

$$r_{m,n-1} = j \cdot (x_{m,n-1} + \Lambda_{m,n-1}) + (\Phi_{m,n-1} + \Psi_{m,n-1} + \Xi_{m,n-1}) \tag{19}$$

The $d_{m',n'}$ is the data signal at frequency-time point (m',n'), $\mathbb{O}$ is a set of indices of all of frequency-time points that may cause interference to the imaginary part or the real part of the frequency-time point (m,n−1), $\Psi_{m,n-1}$ is the interference to the imaginary part or the real part of the frequency-time point (m,n−1) from all of frequency-time points in $\mathbb{O}$, $\Xi_{m,n-1}$ is self interference experienced by frequency-time point (m,n−1) from all the other frequency-time points in the preprocessing OQAM symbols, i.e., intrinsic real or imaginary interference between subcarriers, $\Phi_{m,n-1}$ is the interference to the imaginary part or the real part at the frequency-time point (m,n−1) in preprocessing OQAM symbols from subcarriers of the preprocessing QAM symbols, $\Lambda_{m,n-1}$ is the interference to the imaginary part or the real part at the frequency-time point (m,n−1) of the preprocessing OQAM symbols from subcarriers of the preprocessing QAM symbols. The receiving device may extract the real part or the imaginary part from each subcarrier of the preprocessing OQAM symbols. In a distortion-free channel, the intrinsic interference experienced by each subcarrier of the preprocessing OQAM symbols only includes $\{\Lambda_{m,n-1}\}$. In FIG. 15, $\{\Lambda_{m,n-1}\}$ is denoted by solid arrows.

The following still refers to FIG. 15 to analyze the interference experienced by subcarriers of the preprocessing QAM symbols. To facilitate description, a first preprocessing QAM symbol vector (i.e., the first category-3 QAM symbol vector) and a second preprocessing QAM symbol vector (i.e., the second category-3 QAM symbol vector) are defined as follows. Since complex data symbols are transmitted in subcarriers of the preprocessing QAM symbols, the first preprocessing QAM symbol vector may refer to symbols on subcarriers of the preprocessing QAM symbols that have a different real-imaginary alternate effect from that of symbols on subcarriers of adjacent preprocessing OQAM symbols, i.e., the vector $\bar{y}=[\bar{y}[0],\bar{y}[1], \ldots , \bar{y}[M-1]]^T=[y_{0,n},j\cdot y_{1,n}, \ldots ,j\cdot y_{M-1,n}]^T$ in example two. The second preprocessing QAM symbol vector may refer to symbols on subcarriers of the preprocessing QAM symbols that have a different real-imaginary alternate effect from that of symbols on subcarriers of adjacent preprocessing OQAM symbols, i.e., the vector $\bar{z}=[\bar{z}[0],\bar{z}[1], \ldots , \bar{z}[M-1]]^T=[j\cdot z_{0,n},z_{1,n}, \ldots ,z_{M-1,n}]^T$ of example two. It is clear that $\bar{y}$ and $\bar{z}$ compose the complex data symbol vector $\overline{yz}$ on subcarriers of the preprocessing QAM symbols.

Supposing $r_{m,n}^I$ is an equivalent complex signal composed at the (m,n)'th frequency-time point in the first preprocessing QAM symbol, which include original modulated data symbols and interferences, when m is an even number:

$$r'_{m,n} = j \cdot \left( \underbrace{y_{m,n} + \sum_{m'=0,m'\neq m}^{M-1} \beta_{m',n,m,n} z_{m',n}}_{\Lambda'_{m,n}} + \underbrace{\sum_{m'=0}^{M-1} \beta_{m',n-1,m,n} x_{m',n-1}}_{\phi'_{m,n}} + \tag{20}$$

$$\underbrace{\sum_{m',n'} \beta_{m',n',m,n} d_{m',n'} + \beta_{m+1,n,m,n} y_{m+1,n} + \beta_{m-1,n,m,n} y_{m-1,n}}_{\Xi'_{m,n}} \right)$$

When m is an odd number:

$$r_{m,n}^I = y_{m,n} + \Lambda_{m,n}^I + j \cdot (\Phi_{m,n}^I + \Psi_{m,n}^I + \Xi_{m,n}^I) \tag{21}$$

The $d_{m',n'}$ is the data signal at frequency-time point (m',n'), $\mathbb{O}$ is a set of indices of all frequency-time points excluding the auxiliary data symbol and the preprocessing data symbols that may cause interference to real parts or imaginary parts at the frequency-time point (m,n) of the first preprocessing QAM symbol, $\Psi_{m,n}^I$ is the interference to real parts or imaginary parts at frequency-time point (m,n) of the first preprocessing QAM symbol from all of frequency-time points in $\mathbb{O}$, $\Xi_{m,n}^I$ is self interference at frequency-time point (m,n) from all the other frequency-time points in the first preprocessing QAM symbol, i.e., the real part or imaginary part interference between subcarriers, $\Phi_{m,n}^I$ is interference to real part or imaginary part at frequency-time point (m,n) of the first preprocessing QAM symbol from subcarriers of the preprocessing OQAM symbol, $\Lambda_{m,n}^I$ is the interference to the real part or the imaginary part at frequency-time point (m,n) of the first preprocessing QAM symbol from subcarriers of the second preprocessing QAM symbol. The receiving device may extract the real part or the imaginary part from each subcarrier of the preprocessing QAM symbols. In a distortion-free channel, the intrinsic interference experienced by each subcarrier of the first preprocessing QAM symbols may only include $\{\Lambda_{m,n}^I\}$. In FIG. 15, $\{\Lambda_{m,n}^I\}$ is denoted by solid arrows.

Assuming that $R_{m,n}^Q$ is an equivalent complex signal composed at the (m,n)'th frequency-time point in the second preprocessing QAM symbols, which include original modulated data symbols and interferences, when m is an even number:

$$r_{m,n}^Q = z_{m,n} + \underbrace{\sum_{m'=0,m'\neq m}^{M-1} \beta_{m',n,m,n} y_{m',n}}_{\Lambda_{m,n}^Q} + \underbrace{\sum_{m'=0}^{M-1} \beta_{m',n-1,m,n} x_{m',n-1}}_{\phi_{m,n}^Q} + \tag{22}$$

-continued $$\sum\nolimits_{m',n'\in\mathbb{O}}\beta_{m',n',m,n}d_{m',n'} + \underbrace{j\cdot\beta_{m+1,n,m,n}z_{m+1,n} + \beta_{m-1,n,m,n}z_{m-1,n}}_{\Xi_{m,n}^Q}$$
$$\underbrace{\phantom{\sum\beta_{m',n',m,n}d_{m',n'}}}_{\psi_{m,n}^Q}$$

When m is an odd number:

$$r_{m,n}^Q = j\cdot(z_{m,n} + \Lambda_{m,n}^Q + \Phi_{m,n}^Q + \Psi_{m,n}^Q) + \Xi_{m,n}^Q \quad (23)$$

The $d_{m',n'}$ is the data signal at frequency-time point (m',n'), $\mathbb{O}$ is a set of indices of all frequency-time points excluding the auxiliary data symbol and the preprocessing data symbols that may cause interference to real parts or imaginary parts at the frequency-time point (m,n) of the second preprocessing QAM symbol, $\Psi_{m,n}^Q$ is the interference to real parts or imaginary parts at frequency-time point (m,n) of the second preprocessing QAM symbol from all of frequency-time points in $\mathbb{O}$, $\Xi_{m,n}^Q$ is self interference at frequency-time point (m,n) from all the other frequency-time points in the second preprocessing QAM symbol, i.e., the real part or imaginary part interference between subcarriers, $\Phi_{m,n}^Q$ is interference to real part or imaginary part at frequency-time point (m,n) of the second preprocessing QAM symbol from subcarriers of the preprocessing OQAM symbol, $\Lambda_{m,n}^Q$ is the interference to the real part or the imaginary part at frequency-time point (m,n) of the second preprocessing QAM symbol from subcarriers of the first preprocessing QAM symbol. The receiving device may extract the real part or the imaginary part from each subcarrier of the second preprocessing QAM symbol. In a distortion-free channel, the intrinsic interference experienced by each subcarrier of the second preprocessing QAM symbol may include $\{\Lambda_{m,n}^Q\}$, and $\{\Phi_{m,n}^Q\}$, and $\{\Psi_{m,n}^Q\}$. In FIG. 15, $\{\Lambda_{m,n}^Q\}$, $\{\Phi_{m,n}^Q\}$, and $\{\Psi_{m,n}^Q\}$ are denoted by solid arrows.

According to formulae (18) to (23) with reference to FIG. 15, the intrinsic interference correlation matrix between the preprocessing OQAM symbol and the preprocessing QAM symbol may be calculated as:

$$D = \begin{bmatrix} I_M & 0_M & \Lambda_{n-1} \\ 0_M & I_M & \Lambda_n^I \\ \Phi_n^Q & \Lambda_n^Q & I_M \end{bmatrix} \underbrace{\begin{bmatrix} \tilde{x} \\ \tilde{y} \\ \tilde{z} - \Psi_n^Q \end{bmatrix}}_{\Gamma} \quad (24)$$

In the formula, $$\tilde{x} = [\tilde{x}[0], \tilde{x}[1], \ldots, \tilde{x}[M-1]]^T = [x_{0,n}, x_{1,n}, \ldots, x_{M-1,n}]^T$$

$$\tilde{y} = [\tilde{y}[0], \tilde{y}[1], \ldots, \tilde{y}[M-1]]^T = [y_{0,n}, y_{1,n}, \ldots, y_{M-1,n}]^T$$

$$\tilde{z} = [\tilde{z}[0], \tilde{z}[1], \ldots, \tilde{z}[M-1]]^T = [z_{0,n}, z_{1,n}, \ldots, z_{M-1,n}]^T$$

$I_M$ is an unitary matrix of M×M, $O_M$ is a null matrix of M×M, and:

$$\Lambda_{n-1} = \begin{bmatrix} \beta_{0,n,0,n-1} & \beta_{1,n,0,n-1} & 0 & \cdots & 0 \\ \beta_{0,n,1,n-1} & \beta_{1,n,1,n-1} & \beta_{2,n,1,n-1} & \cdots & 0 \\ \vdots & \vdots & \vdots & \ddots & \vdots \\ 0 & 0 & 0 & \cdots & \beta_{M-1,n,M-1,n-1} \end{bmatrix}$$

$$\Lambda_n^I = \Lambda_n^Q = \begin{bmatrix} \beta_{0,n,0,n} & \beta_{1,n,0,n} & 0 & \cdots & 0 \\ \beta_{0,n,1,n} & \beta_{1,n,1,n} & \beta_{2,n,1,n} & \cdots & 0 \\ \vdots & \vdots & \vdots & \ddots & \vdots \\ 0 & 0 & 0 & \cdots & \beta_{M-1,n,M-1,n} \end{bmatrix}$$

$$\Phi_n = \begin{bmatrix} \beta_{0,n-1,0,n} & \beta_{1,n-1,0,n} & 0 & \cdots & 0 \\ \beta_{0,n-1,1,n} & \beta_{1,n-1,1,n} & \beta_{2,n-1,1,n} & \cdots & 0 \\ \vdots & \vdots & \vdots & \ddots & \vdots \\ 0 & 0 & 0 & \cdots & \beta_{M-1,n-1,M-1,n} \end{bmatrix}$$

$$\Psi_n = \begin{bmatrix} \beta_{0,n',0,n} & \beta_{1,n',0,n} & 0 & \cdots & 0 \\ \beta_{0,n',1,n} & \beta_{1,n',1,n} & \beta_{2,n',1,n} & \cdots & 0 \\ \vdots & \vdots & \vdots & \ddots & \vdots \\ 0 & 0 & 0 & \cdots & \beta_{M-1,n',M-1,n} \end{bmatrix} \cdot \begin{bmatrix} d_{0,n'} \\ d_{1,n'} \\ \vdots \\ d_{M-1,n'} \end{bmatrix},$$

$n' \in \mathbb{Z}, n' \neq n-1, n$

At block 1303, the preprocessing OQAM symbols and the preprocessing QAM symbols that are to be transmitted (i.e., the actually transmitted preprocessing OQAM symbols and the actually transmitted preprocessing QAM symbols) may be calculated using the target data symbols of the preprocessing OQAM symbols, the target data symbols of the preprocessing QAM symbols, the target data symbols of the auxiliary data symbols and the intrinsic interference correlation matrix of the preprocessing OQAM symbols and the preprocessing QAM symbols calculated at block 1302.

In an example, the target PAM (real) data symbols may be denoted as $\tilde{d}_{n-1} = [d_{0,n-1}, d_{1,n-1}, \ldots, d_{M-1,n-1}]^T$, $\tilde{d}_n = [d_{0,n}, d_{1,n}, \ldots, d_{M-1,n}]^T$, and $\tilde{d}_{n+1} = [d_{0,n+1}, d_{1,n+1}, \ldots, d_{M-1,n+1}]^T$. Given that the intrinsic interference correlation matrix obtained above is equal to a target data symbol vector composed of the three target PAM data symbols, it is set that $$D = \underbrace{\begin{bmatrix} I_M & 0_M & \Lambda_{n-1} \\ 0_M & I_M & \Lambda_n^I \\ \Phi_n^Q & \Lambda_n^Q & I_M \end{bmatrix}}_{\Gamma} \begin{bmatrix} \tilde{x} \\ \tilde{y} \\ \tilde{z} - \Psi_n^Q \end{bmatrix} = \begin{bmatrix} \tilde{d}_{n-1} \\ \tilde{d}_n \\ \tilde{d}_{n+1} \end{bmatrix} \quad (25)$$

It can be obtained that, $$\begin{bmatrix} \tilde{x} \\ \tilde{y} \\ \tilde{z} \end{bmatrix} = \Gamma^{-1} \begin{bmatrix} \tilde{d}_{n-1} \\ \tilde{d}_n \\ \tilde{d}_{n+1} + \Psi_n^Q \end{bmatrix} \quad (26)$$

When m is an even number, it may be set that $\bar{x}[m] = \tilde{x}[m]$, $\bar{y}[m] = j\cdot\tilde{y}[m]$, $\bar{z}[m] = \tilde{z}[m]$. When m is an odd number, it may be set that $\bar{x}[m] = j\cdot\tilde{x}[m]$, $\bar{y}[m] = \tilde{y}[m]$, and $\bar{z}[m] = j\cdot\tilde{z}[m]$. Then, it may be obtained that the preprocessing OQAM symbols and the preprocessing QAM symbols are $\bar{x}$ and $\overline{yz} = \bar{y} + \bar{z}$ respectively. The above is about the auxiliary data symbol and the preprocessing data symbol at the tail of the data block. Processing of the auxiliary data symbol and the preprocessing data symbol at the head of the data block may be carried out in a similar manner, thus is not elaborated herein.

In view of the foregoing, in example two, the auxiliary data symbols are the first OQAM symbol from the head of the user data block and the first OQAM symbol from the tail of the user data block, the preprocessing QAM symbols are the second OQAM symbol from the head of the user data block and the second OQAM symbol from the tail of the user data block, and the preprocessing OQAM symbols are the third OQAM symbol from the head of the user data block and the third OQAM symbol from the tail of the user data block. The actually transmitted data symbols of the auxiliary data symbols are dummy data symbols. The actually transmitted data symbols of the preprocessing OQAM symbols and the actually transmitted data symbols of the preprocessing QAM symbols may be calculated according to the interference experienced by the preprocessing OQAM symbols from the second preprocessing QAM symbols, the interference experienced by the first preprocessing QAM symbols from second preprocessing QAM symbols on adjacent subcarriers, the interference experienced by the second preprocessing QAM symbols from adjacent preprocessing OQAM symbols and from first preprocessing QAM symbols on adjacent subcarriers, such that the received preprocessing OQAM symbols which is a composite of the actually transmitted data symbols and the interference from the second preprocessing QAM symbols equal to that target data symbols of the preprocessing OQAM symbols, that the received preprocessing QAM symbols which is a composite of the first preprocessing QAM symbol and interference from the second preprocessing QAM symbol equal to the target data symbol of the preprocessing OQAM symbol, and that the received preprocessing QAM symbol which is a composite of the second preprocessing QAM symbol and interference from adjacent preprocessing OQAM symbols and from the first preprocessing QAM symbol equal to the target data symbols of the auxiliary data symbols.

In an example, the method of calculating the actually transmitted data symbols of the preprocessing QAM symbol and the actually transmitted data symbols of the preprocessing OQAM symbol may include:

determining an intrinsic interference correlation matrix between the preprocessing QAM symbols and the preprocessing OQAM symbols according to interference experienced by the preprocessing OQAM symbols from the second preprocessing QAM symbols, interference experienced by the first preprocessing QAM symbol from second preprocessing QAM symbols on adjacent subcarriers, interference experienced by the second preprocessing QAM symbols from adjacent preprocessing OQAM symbols and from first category-3 symbols on adjacent subcarriers, and calculating the actually transmitted data symbols of the preprocessing OQAM symbols and the actually transmitted data symbols of the preprocessing QAM symbols based on a fact that the intrinsic interference correlation matrix equals to a first symbol vector; the first symbol vector is a data symbol vector composed of target data symbols of all the preprocessing OQAM symbols, target data symbols of all the preprocessing QAM symbols and target data symbols of all the auxiliary data symbols.

The example two takes a preprocessing data symbol which includes two OQAM symbols as an example. The method of example two may be easily applied to situations in which the preprocessing data symbol includes more than two OQAM symbols.

Figure 16:
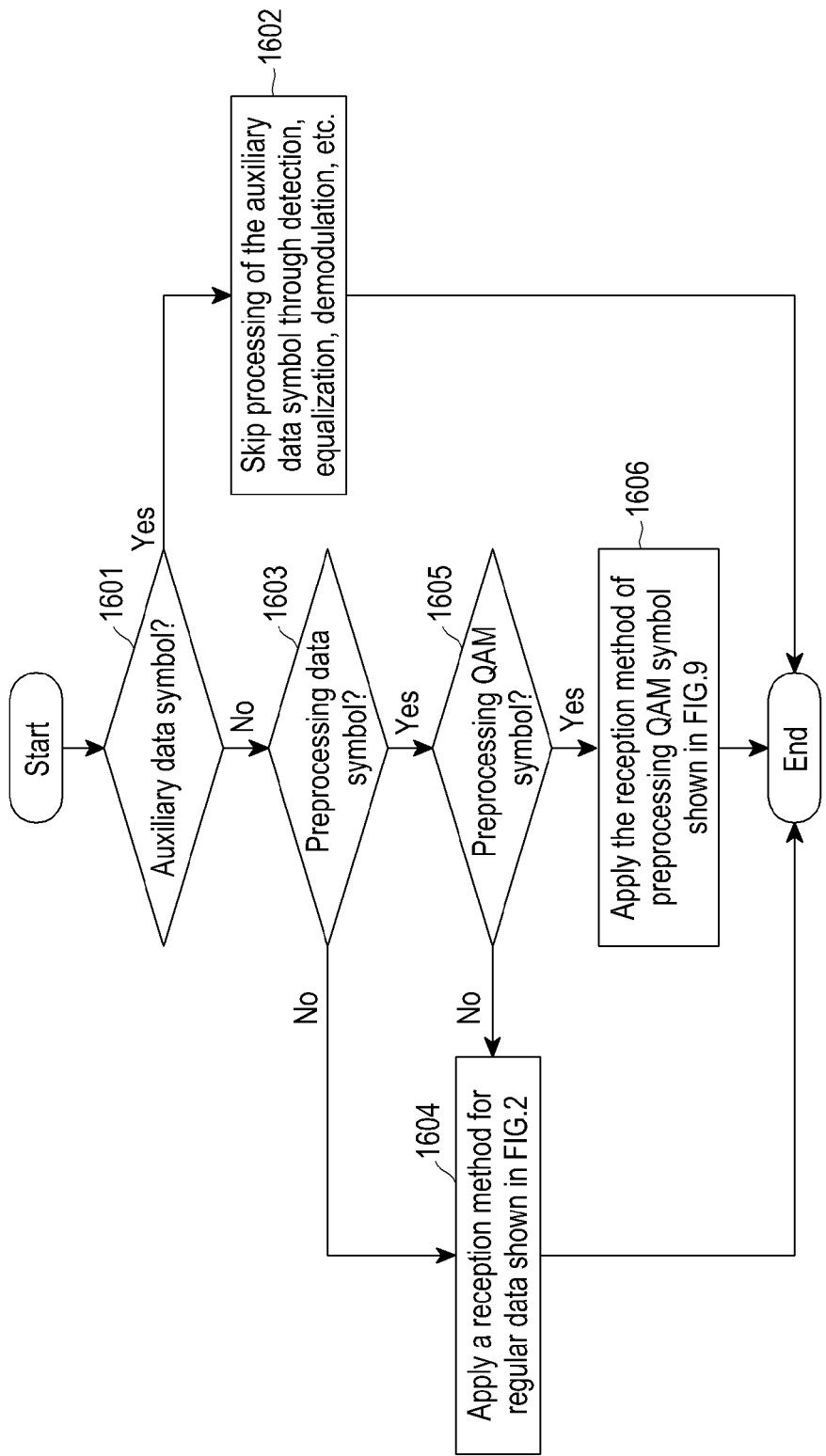
FIG. 16 illustrates a schematic diagram of reception and demodulation of a data block in an FBMC/OQAM system according to an embodiment of the present disclosure.

Referring to FIG. 16, a demodulation process performed by a receiving device of example two may include the following procedures.

At block 1601, a receiving device judges whether a received OQAM symbol is an auxiliary data symbol according to pre-defined data block configurations. The data block configurations may include information about the number and the positions of special data symbols, auxiliary data symbols and preprocessing data symbols within a data block. The configurations may be generated by a transmitting device or a receiving device which transmits the configurations to the communication counterpart via control signaling, so that the transmitting device and the receiving device adopt the same data block configurations in one transmission.

At block 1602, in response to a determination that the received data symbol is an auxiliary data symbol, the receiving device may not perform operations including detection, channel equalization, demodulation, etc. on the auxiliary data symbol.

At block 1603, if the received data symbol is not an auxiliary data symbol, the receiving device may determine whether the received data symbol is a preprocessing data symbol according to the data block configurations.

At block 1604, if the received data symbol is not a special data symbol, i.e., neither an auxiliary data symbol nor a preprocessing data symbol, the receiving device may perform processing, e.g., detection, channel equalization, demodulation, etc., on the received symbol using the method of receiving a regular data symbol as shown in FIG. 2.

At block 1605, if the received data symbol is a preprocessing data symbol, the receiving device may determine whether the received data symbol is a preprocessing QAM symbol according to the data block configurations. If the received data symbol is not a preprocessing QAM symbol, i.e., the received data symbol is a preprocessing OQAM symbol, the receiving device may perform operations such as detection, channel equalization, demodulation, etc., on the received symbol using a method of receiving a regular data symbol as shown in FIG. 2.

At block 1606, if the received data symbol is a preprocessing QAM symbol, the receiving device may perform operations such as detection, channel equalization, demodulation, etc., on the received data symbol according to the reception method for preprocessing a complex data symbol as shown in FIG. 9.

In an example, the real part and the imaginary part of the preprocessing QAM symbol may be extracted, and determined to be two individual data symbols, i.e., a target data symbol of the preprocessing QAM symbol and a target data symbol of an auxiliary data symbol. An extracted part that has the reversed real-imaginary effect with an adjacent OQAM symbol in the time domain is a target data symbol of the preprocessing QAM symbol, and the other extracted part that has the same real-imaginary effect with the adjacent OQAM symbol in the time domain is a target data symbol of the auxiliary data symbol. For example, if the real symbol is extracted from OQAM symbol $y_{m,n-1}$, the real part extracted from preprocessing QAM symbol $y_{m,n}$ is the target data symbol of the auxiliary data symbol, and the extracted imaginary part of $y_{m,n}$ is the target data symbol of the preprocessing QAM symbol.

Figure 17:
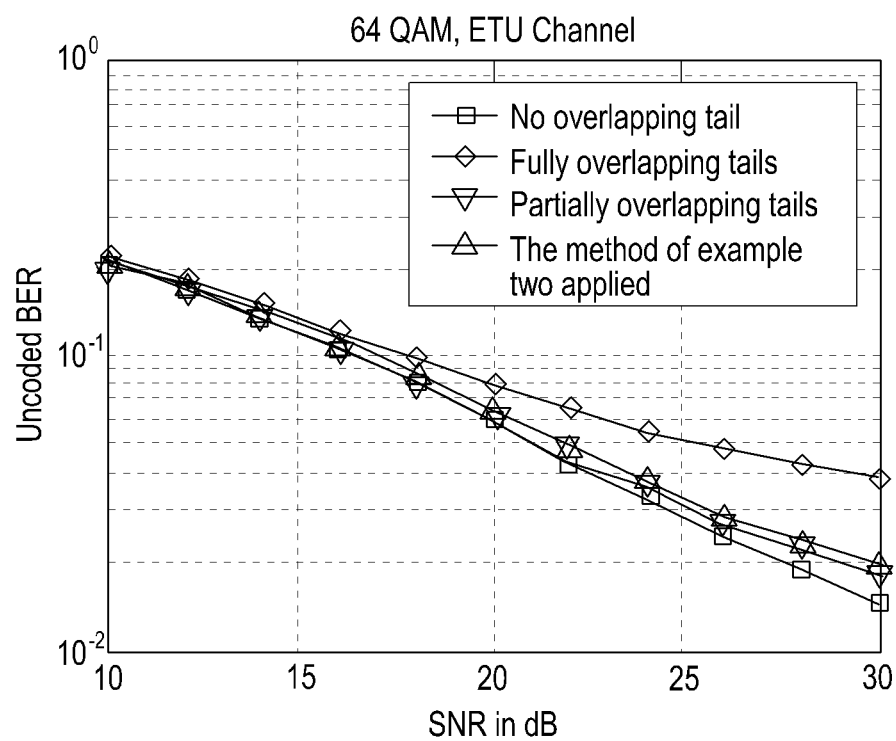
FIG. 17 illustrates a schematic diagram of simulation of tail effect of the data block in an FBMC/OQAM system according to an embodiment of the present disclosure.

FIG. 17 illustrates a schematic diagram of a simulation result of the method according to an embodiment of the present disclosure. From the simulation result it can be seen that the method of example two can effectively reduce the interference between data blocks resulted from the tail of a data block overlapping with the head of another data block while not reducing the data transmission efficiency and spectrum efficiency of the system. Further, it can be seen by comparing the result shown in FIG. 17 with that shown in FIG. 11 that, the method of example two has better system performances in terms of bit error rates than example one, and the system performances are approximate to system performances when there is no head and tail effect between data blocks.

Example Three

The above example one and example two describe solutions to the head and tail effect problem in data block transmission in an FBMC/OQAM system. Example three provides a communication process between a transmitting device and a receiving device according to the above methods, and application of the methods to multi-user uplink communications and TDD uplink/downlink communications.

Figure 18A:
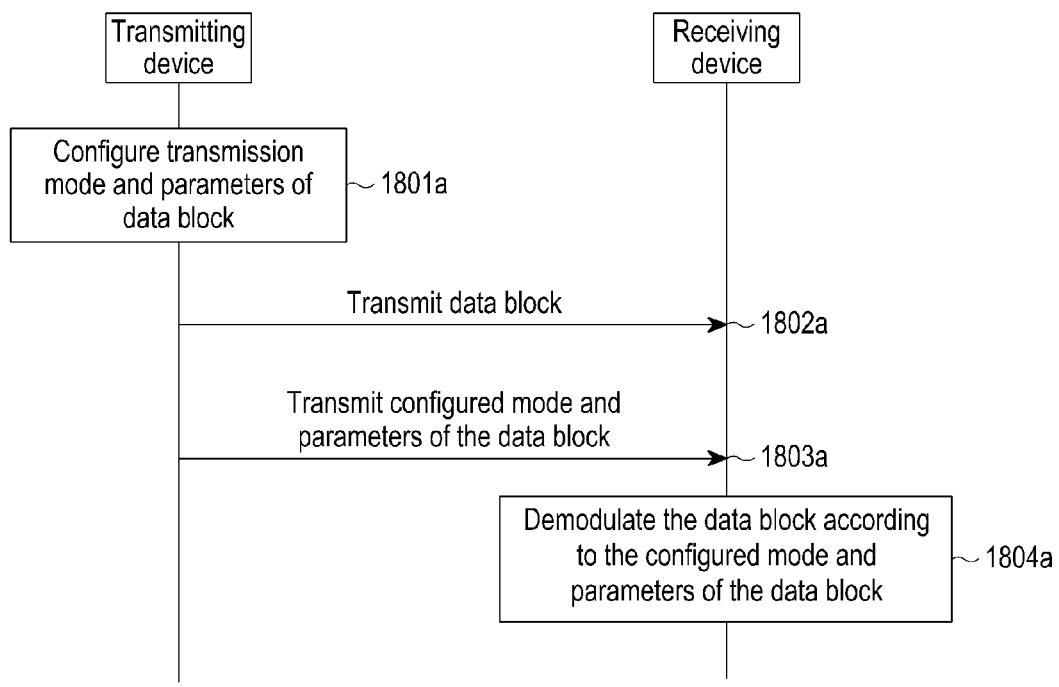
FIG. 18A illustrates a flowchart of a communication process between a transmitting device and a receiving device according to an embodiment of the present disclosure.

FIG. 18A illustrates a schematic diagram of a communication process between a transmitting device and a receiving device according to an embodiment of the present disclosure. As shown in FIG. 18A, the process may include the following procedures.

At block 1801a, the transmitting device configures a transmission mode and parameters of a data block according to system configuration information, e.g., a type of the data block, available time-frequency resources, etc. In an example, the data block transmission mode may include the structure of the data block and corresponding transmission modes of examples one and two, conventional transmission mode of conventional OQAM data blocks, or the like. In an example, configurations of the structure of the data block and corresponding transmission modes of examples one and two may include information of special data symbols. The information may include the position and the number of the special data symbols, or the like. The special data symbols may include the preprocessing data symbols and the auxiliary data symbols. The parameters may include a transmission power, a modulation and encoding scheme, or the like.

At block 1802a, the transmitting device may transmit the configured data block to the receiving device.

At block 1803a, the transmitting device may transmit the data block configuration mode and corresponding parameters determined at block 1801a to the receiving device, to enable the receiving device to demodulate the specially configured data block using the same data block configuration information and parameters with the transmitting device.

At block 1804a, the receiving device may demodulate the received data block using a received data block configuration mode and parameters. The demodulation method may include the demodulation methods of example one and example two, the reception and demodulation method of conventional OQAM systems as shown in FIG. 2, and the like.

Figure 18B:
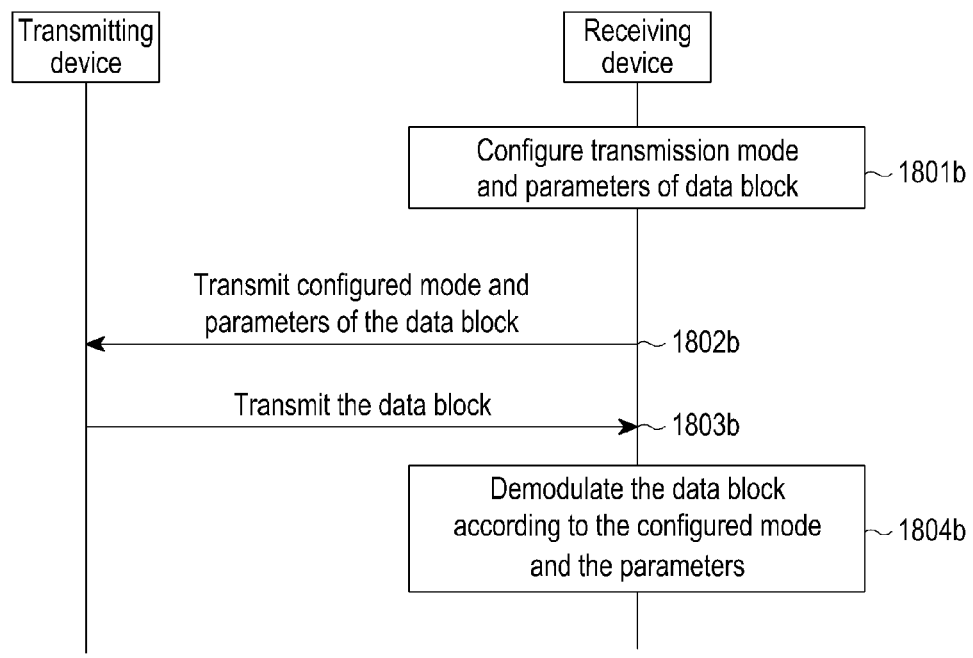
FIG. 18B illustrates a flowchart of a communication process between a transmitting device and a receiving device according to an embodiment of the present disclosure.

FIG. 18B illustrates a schematic diagram of a communication process between a transmitting device and a receiving device in accordance with an example of the present disclosure. As shown in FIG. 18A, the process may include the following procedures.

At block 1801b, the receiving device configures a transmission mode and parameters of a data block according to system configuration information, e.g., a type of the data block, resources scheduling requests, available time-frequency resources, etc. In an example, the data block transmission mode may include the structure of the data block and corresponding transmission modes of examples one and two, conventional transmission mode of conventional OQAM data blocks, or the like. In an example, configurations of the structure of the data block and corresponding transmission modes of examples one and two may include information of special data symbols. The information may include the position and the number of the special data symbols, or the like. The special data symbols may include the preprocessing data symbols and the auxiliary data symbols. The parameters may include a transmission power, a modulation and encoding scheme, or the like.

At block 1802b, the receiving device may transmit the data block configuration mode and parameters determined in block 1801b to the transmitting device.

At block 1803b, the transmitting device may specially configure the data block using the received data block configuration mode and the parameters so that the transmitting device and the receiving device use the same data block configuration mode and parameters for modulating and demodulating the data block.

At block 1804b, the receiving device may demodulate the received data block using the data block configuration mode and parameters determined in block 1801b. The demodulation method may include the demodulation methods of example one and example two, the reception and demodulation method of conventional OQAM systems as shown in FIG. 2, and the like.

Figure 19:
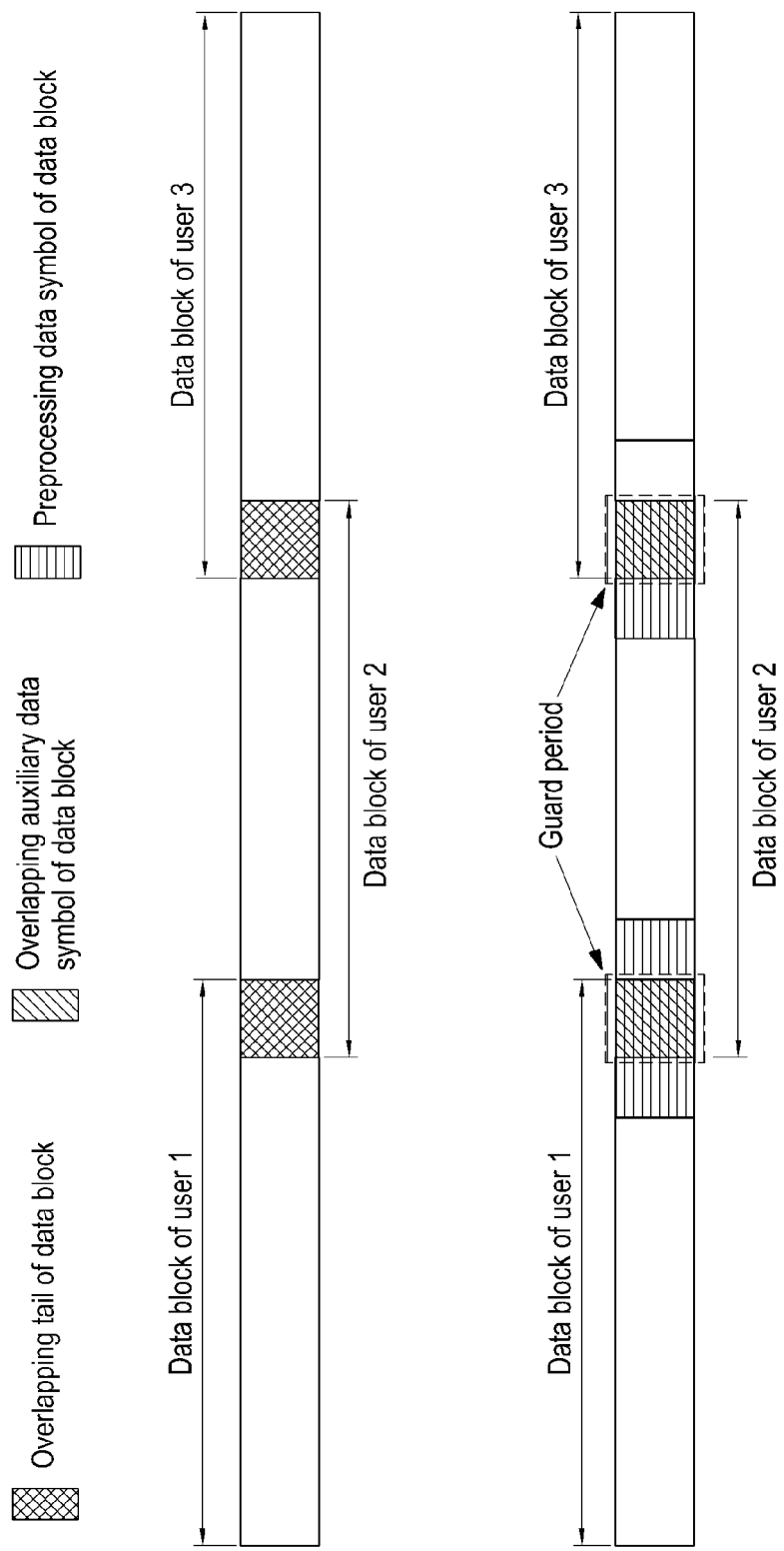
FIG. 19 illustrates a schematic diagram of application of the method in a multi-user uplink transmission scenario according to an embodiment of the present disclosure.

The above data block structure and communication process can greatly improve the spectrum efficiency of a wireless communication system, especially a multi-user uplink system or a TDD system. FIG. 19 illustrates a schematic diagram of a multi-user uplink transmission scenario according to an embodiment of the present disclosure. As shown in FIG. 19, multiple user data blocks are scheduled to be transmitted successively in time to improve the data transmission efficiency. But the overlapping of the tail of a data block with the head of another data block resulted from the head and tail effect may generate severe interference between the data blocks. If the interference is not solved properly and effectively, the system spectrum efficiency and reception reliability may be degraded significantly. According to the structure of data blocks, the transmission and reception method of various examples, overlapping auxiliary data symbols form a guard period between data blocks which can decouple different user data blocks and reduce the interference resulted from the overlapping of the tail of a data block with the head of another data block. The auxiliary data symbols and the preprocessing data symbols are jointly designed to maintain the data transmission efficiency and improve the spectrum efficiency of the system.

Figure 20:
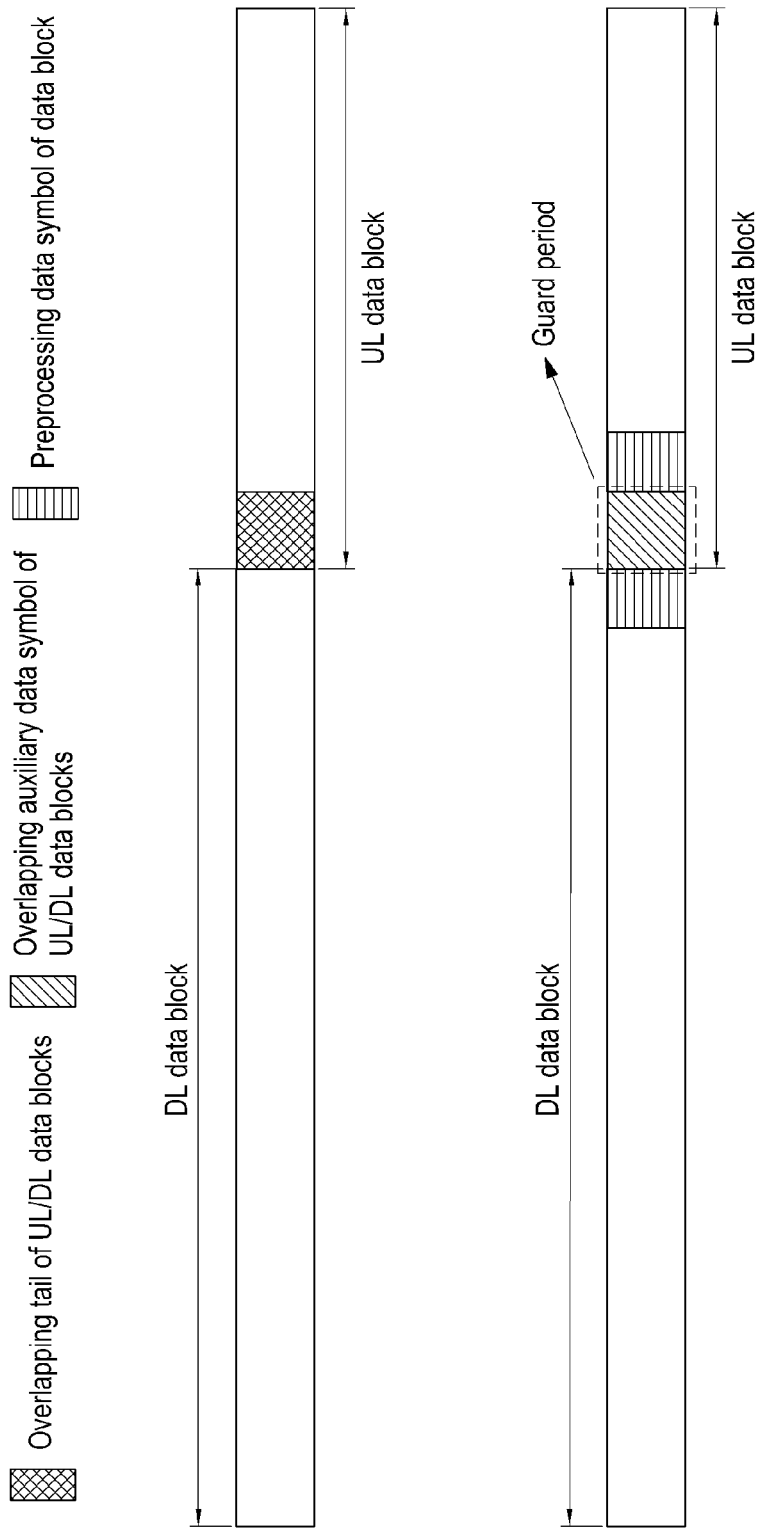
FIG. 20 illustrates a schematic diagram of application of the method in a TDD system according to an embodiment of the present disclosure.

In addition, as shown in FIG. 20, the mechanism may also be applied to a TDD system. In a TDD system, a guard period is configured at the switching point of a downlink time slot and an uplink time slot to avoid uplink/downlink interference. Due to the head and tail effect, the uplink/downlink interference may become worse, and the situation may become more complex. A longer guard period is needed, which reduces the spectrum efficiency. The structure of data blocks and the transmission and reception method may be applied to the last symbol of a downlink data block and the first symbol of an uplink data block to effectively avoid interference generated in the switch of uplink/downlink time slots, and improve system spectrum efficiency.

Example Four

Figure 21:
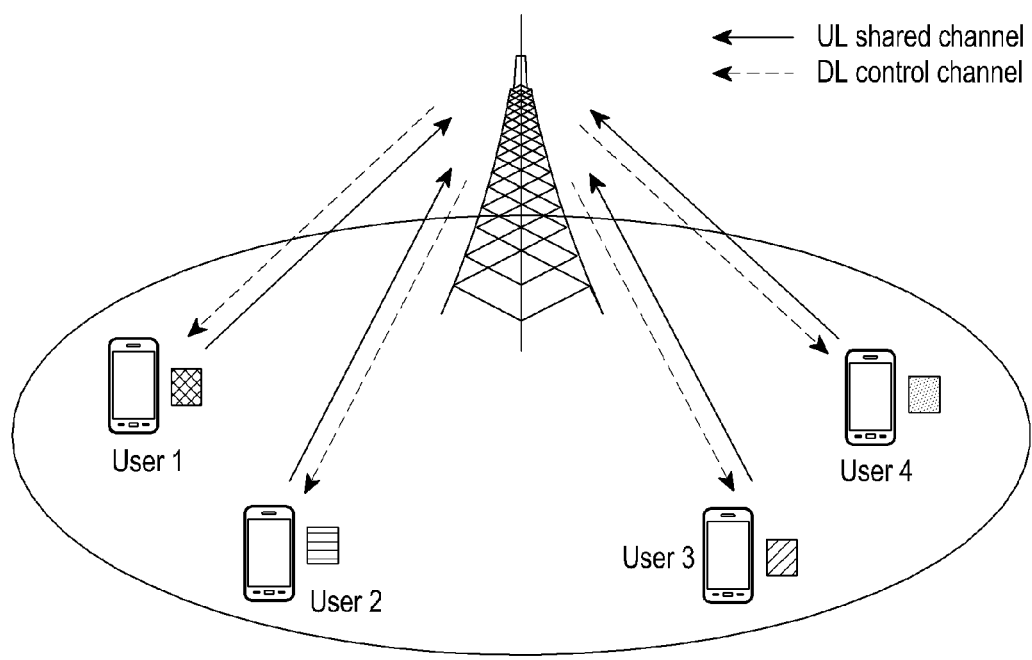
FIG. 21 illustrates a schematic diagram of communication between a base station and a user terminal to support frequency hopping of an uplink shared channel according to an embodiment of the present disclosure.

In example four, the method of various examples is applied to frequency hopping of an uplink shared channel. FIG. 21 is a schematic diagram illustrating communication between a base station and a user terminal to support frequency hopping of an uplink shared channel in accordance with example four of the present disclosure. As shown in FIG. 21, there are four users in a cell served by a base station aspiring to establish communication links with the base station. Before establishing an uplink shared channel (e.g., physical uplink shared channel, PUSCH) with a user terminal, the base station may configure an uplink transmission mode of the user terminal via scheduling information transmitted in downlink control information (DCI) in a downlink control channel (physical downlink control channel, PDCCH). In conventional LTE system, DCI format 0 includes information for starting and controlling frequency hopping of PUSCH. According to the information, a user device may perform frequency hopping at corresponding time-frequency resources to obtain the frequency diversity gain.

Various examples provide specially designed user data block structure, transmission method and reception method to avoid a tail of a first user data block overlapping with a head of a second user data block when the two user data blocks are transmitted successively. In addition, in an uplink PUSCH frequency hopping system, a user data block may experience influence from head and tail effects of other user data blocks at different time-frequency resources. Thus, the method of examples one and two may be applied to the head and tail of a user data block, and the communication process of example three may be adopted. In this case, extra downlink control signaling may be used to enable FBMC/OQAM in frequency hopping in uplink shared channel. In an example, the extra downlink control signaling may include an index of time-frequency resources on which a user data block is to adopt the data block structure of example one and/or two and the transmission method and the reception method are to be applied.

Figure 22:
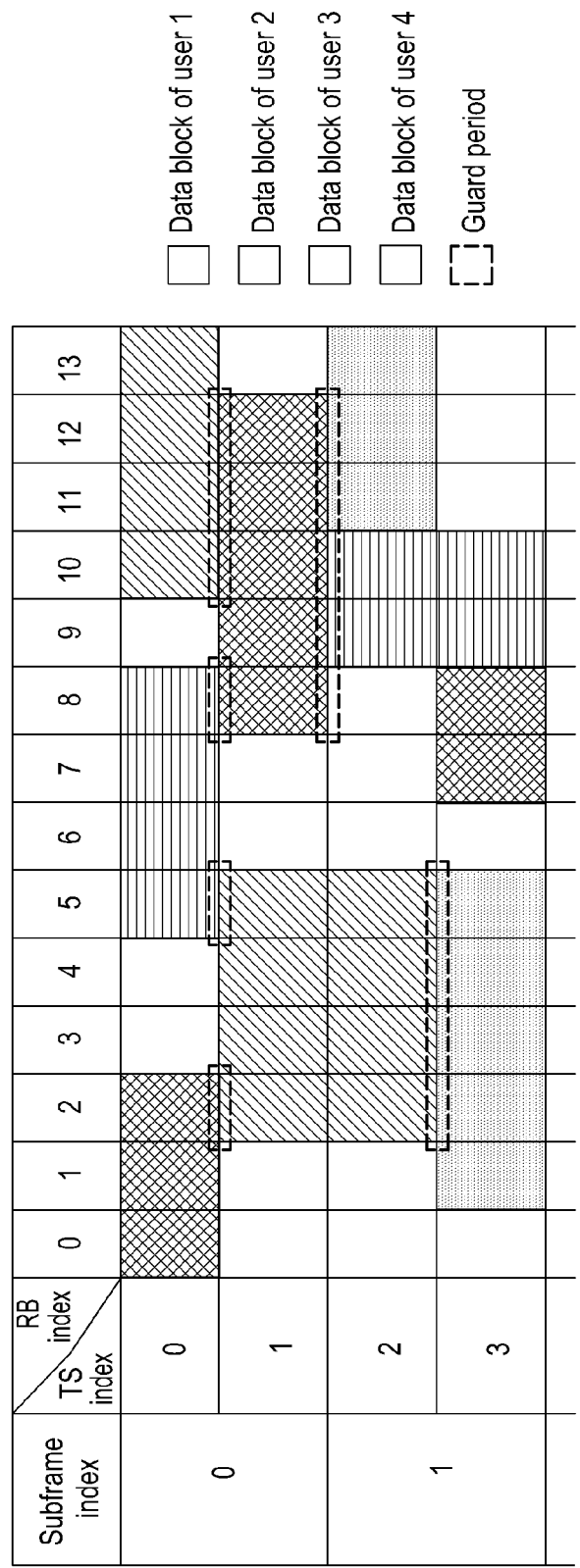
FIG. 22 illustrates a schematic diagram of the principle of frequency hopping of an uplink shared channel according to an embodiment of the present disclosure.

FIG. 22 illustrates a schematic diagram of a principle of PUSCH frequency hopping according to an embodiment of the present disclosure. Referring to FIGS. 21 and 22, four users in a cell served by a base station may perform PUSCH frequency hopping at respective time-frequency resources according to DCI in a downlink control channel. In an example, if no special actions are taken, the four user data blocks may experience interference of overlapping tails of different user data blocks at different time-frequency resources. A set of resource block indices and time slot indices may be denoted by (x, y). For example, the data block of user 2 may experience interference from data blocks of user 3 and user 1 at the head and the tail of (5, 0), (8, 0), (9, 2) and (10, 2), and no interference from any user data block at head and tail of other resource blocks and time slot resources indices, e.g., (6, 0), (7, 0), (10, 3) or the like. Therefore, regarding user 2 in example four, the base station may instruct user 2 to apply the method of example one and/or two to the head and tail of the time-frequency resources of a data block transmitted by user 2. By using the auxiliary data symbols as a guard period between data blocks, the inter-data block interference resulted from overlapping tails of different user data blocks can be avoided to the greatest extent. Likewise, the base station may also configure the structure of the head and tail of the time-frequency resources corresponding to a data block and transmission and reception method of the data block in user 1, user 3 and user 4 via DCI in a downlink control channel.

The above are examples of the transmission method and reception method in an FBMC/OQAM system of the present disclosure. According to the method, interference between data blocks resulted from head and tail effect can be avoided without changing the data transmission efficiency. In the above examples, the special data symbols are an example of the category-1 data symbols, the auxiliary data symbols and the preprocessing data symbols are examples of the category-2 data symbols and the category-3 data symbols respectively. The category-1, category-2 and category-3 data symbols are used for differentiating the data symbols having different characteristics, and data symbols having the characteristics may be referred to using other terms.

Various examples also provide an apparatus for signal transmission and an apparatus for signal reception in an FBMC/OQAM system which may implement the above signal transmission method and signal reception method respectively.

In an example, the signal transmission apparatus may include a symbol calculating circuit and a transmitter.

The symbol calculating circuit may determine actually transmitted data symbols of category-2 data symbols or actually transmitted data symbols of category-3 data symbols according to interference experienced by the category-3 data symbols from all of adjacent offset quadrature amplitude modulation (OQAM) data symbols and intrinsic interference coefficients from the category-2 data symbols to the category-3 data symbols, so that category-3 data symbols which is a composite of the actually transmitted data symbols and the interferences include target data symbols of the category-3 data symbols and target data symbols of category-2 data symbols; category-1 data symbols are the first $n_1$ OQAM symbols from the head of a user data block and the first $n_2$ OQAM symbols from the tail of the user data block, the category-2 data symbols are the first OQAM symbols from the head of the category-1 data symbols and the first OQAM symbols from the tail of the category-1 data symbols, the category-3 data symbols are OQAM symbols in the category-1 data symbols other than the category-2 data symbols.

The transmitter may transmit the actually transmitted data symbols of the category-3 data symbols and the actually transmitted data symbols of the category-2 data symbols to a receiving device together with other data symbols in the user data block.

The following examples still takes the special data symbols as the category-2 data symbols, the auxiliary data symbols as the category-2 data symbols, and the preprocessing data symbols as the category-3 data symbols.

In an example, corresponding to the transmission method of example one, the signal transmission apparatus may also include a configuring circuit. The configuring circuit may configure auxiliary data symbols to be the first OQAM symbol from the head of the user data block and the first OQAM symbol from the tail of the user data block, and configure preprocessing data symbols to be the second OQAM symbol from the head of the user data block and the second OQAM symbol from the tail of the user data block.

The symbol calculating circuit may determine the actually data symbols of the preprocessing data symbols to be the target data symbols of the preprocessing data symbols, calculate the actually transmitted data symbols of the auxiliary data symbols using the actually transmitted data symbols of the preprocessing data symbols, intrinsic interference experienced by the preprocessing data symbols from adjacent OQAM symbols excluding the auxiliary data symbols and the preprocessing data symbols in the user data block, and self interference between subcarriers of the preprocessing data symbols, so that received preprocessing data symbols which are a composite of the actually transmitted symbols, the intrinsic interference and the self interference equal to complex data symbols composed of the target data symbols of the auxiliary data symbols and the actually transmitted symbols of the preprocessing data symbols. The target data symbols of the auxiliary data symbols and the actually transmitted data symbols of the preprocessing data symbols occur as real parts and imaginary parts alternately in the complex data symbols on the same subcarrier.

In an example, when calculating the actually transmitted data symbols of the auxiliary data symbols, the symbol calculating circuit may calculate intrinsic interference experienced by any one of the preprocessing data symbols from adjacent OQAM symbols excluding the auxiliary data symbols and the preprocessing data symbols, calculate self interference experienced by the preprocessing data symbol from preprocessing data symbols on adjacent subcarriers in the same time slot with the preprocessing data symbol, calculate the sum of the intrinsic interference, the self interference and an actually transmitted data symbol of the preprocessing data symbol, and calculate the difference between the target data symbol and the sum.

When the actually transmitted data symbol of the preprocessing data symbol is real, the symbol calculating circuit may obtain the imaginary part of the difference as residual intrinsic interference in the preprocessing data symbol; when the actually transmitted data symbol of the preprocessing data symbol is imaginary, the symbol calculating circuit may obtain the real part of the difference as the residual intrinsic interference in the preprocessing data symbol.

The symbol calculating circuit may combine residual intrinsic interference of all of the preprocessing data symbols into residual intrinsic interference of a preprocessing data symbol vector, and calculate an actually transmitted data symbol of each auxiliary data symbol using the residual intrinsic interference of the preprocessing data symbol vector as the interference experienced by the preprocessing data symbol vector from an auxiliary data symbol vector. The auxiliary data symbol vector is a set composed of all of the auxiliary data symbols in the user data block, the preprocessing data symbol vector is a set composed of all of the preprocessing data symbols in the user data block.

In an example, corresponding to the transmission method of example two, the signal transmission apparatus may also include a configuring circuit. The configuring circuit may configure the auxiliary data symbols to be the first OQAM symbol from the head of the user data block and the first OQAM symbol from the tail of the user data block, and configure the preprocessing data symbols to include preprocessing OQAM symbols and preprocessing QAM symbols. The preprocessing QAM symbols are the second OQAM symbol from the head of the user data block and the second OQAM symbol from the tail of the user data block, the preprocessing OQAM symbols are the third OQAM symbol from the head of the user data block and the third OQAM symbol from the tail of the user data block.

The symbol calculating circuit may determine the actually transmitted data symbols of the auxiliary data symbols are dummy data symbols. The symbol calculating circuit may calculate the actually transmitted data symbols of the preprocessing OQAM symbols and the actually transmitted data symbols of the preprocessing QAM symbols according to the interference experienced by the preprocessing OQAM symbols from second preprocessing QAM symbols, the interference experienced by first preprocessing QAM symbols from second preprocessing QAM symbols on adjacent subcarriers, the interference experienced by second preprocessing QAM symbols from adjacent preprocessing OQAM symbols and from first preprocessing QAM symbols on adjacent subcarriers, such that the received preprocessing OQAM symbols which are a composite of the actually transmitted data symbols and the interference from the second preprocessing QAM symbols equal to the target data symbols of the preprocessing OQAM symbols, that the received preprocessing QAM symbols which are a composite of the first preprocessing QAM symbol and interference from the second preprocessing QAM symbol equal to the target data symbol of the preprocessing OQAM symbol, and that the received preprocessing QAM symbol which are a composite of the second preprocessing QAM symbol and interference from adjacent preprocessing OQAM symbols and from the first preprocessing QAM symbol equal to the target data symbols of the auxiliary data symbols. The actually transmitted data symbols of the preprocessing QAM symbols are complex symbols, the first preprocessing QAM symbols are symbols which have reversed alternate manner with adjacent symbols in the complex symbols, and the second preprocessing QAM symbols are symbols other than the first preprocessing QAM symbols in the complex symbols.

In an example, when calculating the actually transmitted data symbols of the preprocessing OQAM symbols and the preprocessing QAM symbols, the symbol calculating circuit may determine an intrinsic interference correlation matrix between the preprocessing QAM symbols and the preprocessing OQAM symbols according to interference experienced by the preprocessing OQAM symbols from second preprocessing QAM symbols, interference experienced by the first preprocessing QAM symbols from second preprocessing QAM symbols on adjacent subcarriers, and interference experienced by the second preprocessing QAM symbols from adjacent preprocessing OQAM symbols and from first preprocessing QAM symbols from adjacent subcarriers, and calculate the actually transmitted data symbols of the preprocessing OQAM symbols and the preprocessing QAM symbols based on that the intrinsic interference correlation matrix equals the first symbol vector. The first symbol vector is a symbol vector composed of the target data symbols of all preprocessing OQAM symbols, the target data symbols of all preprocessing QAM symbols and the target data symbols of all auxiliary data symbols.

The signal transmitter may include a user data block configuring circuit. The user data block configuring circuit may receive information of time-frequency resources of the user data block pre-configured via downlink control information, and determine the location of the user data block according to the information.

The above are several examples of the signal transmission apparatus of the present disclosure. The signal reception apparatus may include a type judging circuit and a demodulating circuit.

The type judging circuit may receive a user data block transmitted by a transmitting device, and determine a category of an OQAM symbol to be demodulated in the user data block according to a position of the OQAM symbol in the user data block.

The demodulating circuit may skip demodulation of the OQAM symbol if the OQAM symbol is a category-2 data symbol, demodulate to obtain target data symbols of a category-2 data symbol and a category-2 data symbol if the OQAM symbol is the category-3 data symbol, and extract a real part or an imaginary part of the OQAM symbol as a received data symbol if the OQAM symbol is neither a category-2 data symbol nor a category-3 data symbol. Category-1 data symbols include the first $n_1$ OQAM symbols from the head of the user data block and the first $n_1$ OQAM symbols from the tail of the user data block. Category-2 data symbols include the first $n_2$ OQAM symbols from the head of the user data block and the first $n_2$ OQAM symbols from the tail of the user data block. Category-3 data symbols include OQAM symbols in the category-1 data symbols excluding the category-2 data symbols. $n_1$ and $n_2$ are both pre-defined positive integers, and $n_2 < n_1$.

In an example, corresponding to the signal reception method of example one, the signal reception apparatus may also include a configuring circuit. The configuring circuit may configure the category-2 data symbols to be the first OQAM symbol from the head of the user data block and the first OQAM symbol from the tail of the user data block, and configure the category-3 data symbols to be the second OQAM symbol from the head of the user data block and the second OQAM symbol from the tail of the user data block.

The following examples still takes the special data symbols as the category-2 data symbols, the auxiliary data symbols as the category-2 data symbols, and the preprocessing data symbols as the category-3 data symbols.

According to the above configurations, if the type judging circuit determines the OQAM symbol is a preprocessing data symbol, the demodulating circuit may extract the real part and the imaginary part of the OQAM symbol as two independent received data symbols.

In an example, corresponding to the signal reception method of example two, the signal reception apparatus may also include a configuring circuit. The configuring circuit may configure the category-2 data symbols to be the first OQAM symbol from the head of the user data block and the first OQAM symbol from the tail of the user data block, and configure the preprocessing data symbols to include preprocessing OQAM symbols and preprocessing QAM symbols. The preprocessing QAM symbols are the second OQAM symbol from the head of the user data block and the second OQAM symbol from the tail of the user data block, the preprocessing OQAM symbols are the third OQAM symbol from the head of the user data block and the third OQAM symbol from the tail of the user data block.

According to the above configurations, if the type judging circuit determines the OQAM data symbol to be demodulated is a preprocessing QAM data symbol, the demodulating circuit may extract the real part and the imaginary part of the OQAM data symbol as two independent received data symbols. If the type judging circuit determines the OQAM symbol is a preprocessing OQAM data symbol, the demodulating circuit may extract the real part or the imaginary part of the OQAM data symbol as a received data symbol.

Figure 23:
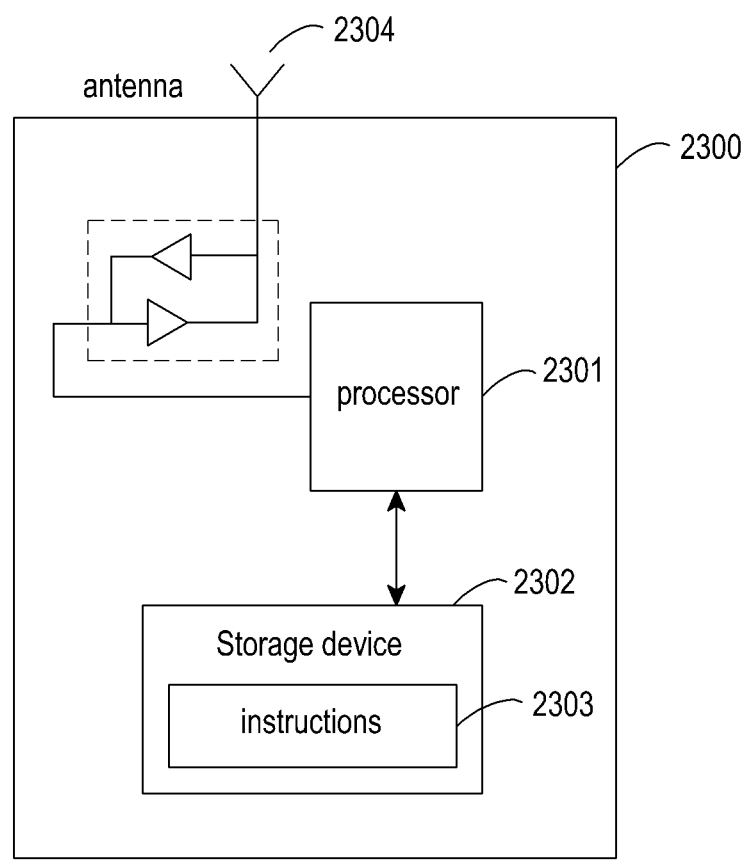
FIG. 23 illustrates a block diagram of the structure of an entity capable of implementing the mechanism of various examples according to an embodiment of the present disclosure.

In an example, the above signal transmission apparatus and the signal reception apparatus may be located in a physical device. FIG. 23 is a block diagram illustrating the structure of an entity 2300 capable of implementing the mechanism of various examples of the present disclosure. The entity 2300 may be configured as a transmitting device, e.g., a transmitter, or a receiving device, e.g., a receiver, or a device having both transmitting and receiving functions, e.g., a transceiver.

As shown in FIG. 23, entity 2300 may include a processor 2301, a storage device 2302 coupled to the processor 2301, and a radio frequency (RF) antenna 2304 coupled to the processor 2301. The storage device 2302 may store a program 2303. The antenna 2304 is capable of performing bi-directional wireless communications. Only one antenna 2304 is shown in FIG. 23, but there may be plural antennas in various examples. The entity 2300 may be coupled to one or plural external networks or systems, e.g., the Internet, via data paths.

The program 2303 may include instructions executable by the processor 2301 to make the entity 2300 performs operations according to various examples, i.e., the entity 2300 acts as the signal transmission apparatus and the signal reception apparatus.

Various examples may be implemented by instructions executable by the processor 2301 of entity 2300, or by hardware, or by hardware and software.

The storage device 2302 may be any types of storage device suitable for the practical environment, and may be implemented by suitable data storage techniques, such as storage device and system based on semi-conductor, magnetic storage device and system, optical storage device and system, portable storage devices and un-portable storage devices, or the like. Only one storage device is shown in entity 2300, but there may be plural independent physical storage in entity 2300. The processor 2301 may be any type of processors suitable for the application scenario, e.g., one or plural selected from the group of: general purposed processor, special purposed processor, digital signal processor (DSP), multi-core processor, and the like.

When the entity 2300 is configured to be a transmitting device, the processor 2301 may generate OQAM signals, and the antenna 2304 may transmit the OQAM signals.

When the entity 2300 is configured to be a receiving device, the antenna 2304 may receive OQAM signals, and the processor 2301 may perform various operations reverse to those performed by a transmitting device, e.g., demodulating received OQAM signals and the like.

Various circuits in entity 2300 may be configured to implement various examples of the present disclosure. The entity 2300 and its circuits may implement the operations and features described with reference to FIG. 5 to FIG. 22, which is not described further herein.

Units or modules of various examples may be implemented through software or hardware. The units or modules may also be configured in the processor, e.g., the processor may include a data block preprocessing unit. The names of the units or modules are not for limiting the units or the modules, e.g., the data block preprocessing unit may also be described as a unit for preprocessing symbols in a data block.

Examples of the present disclosure also provide a computer-readable storage medium. The storage medium may be the storage medium in a base station or a user terminal device, or may be standalone and has not been equipped into a device. The computer-readable storage medium may store one or plural programs which are executable by one or plural processors to implement the signal transmission method or the signal reception method in an FBMC system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of signal transmission in a filter bank multiple carrier (FBMC) system,
the method comprising:
determining actually transmitted data symbols of data symbols of a first category or data symbols of a second category according to intrinsic interference experienced by the data symbols of the second category from all of adjacent offset quadrature amplitude modulation (OQAM) data symbols and intrinsic interference coefficients from the data symbols of the first category to the data symbols of the second category; and transmitting, by a transmitting device, the actually transmitted data symbols of the data symbols of the second category and the actually transmitted data symbols of the data symbols of the first category to a receiving device together with other data symbols in a user data block.

2. The method of claim 1, wherein the data symbols of the second category that is a composite of the actually transmitted data symbols and the interferences comprises information of both target data symbols of the data symbols of the second category and target data symbols of the data symbols of the first category, and wherein data symbols of a third category are first $n_1$ OQAM symbols from a head of a user data block and the first $n_1$ OQAM symbols from a tail of the user data block, and wherein the data symbols of the first category are first $n_2$ OQAM symbols from the head of the data symbols of the third category and the first $n_2$ OQAM symbols from the tail of the data symbols of the third category, and wherein the data symbols of the second category are OQAM symbols in the data symbols of third category excluding the data symbols of the first category, $n_2 < n_1$, $n_1$ and $n_2$ are pre-defined positive integers.

3. The method of claim 1, wherein the data symbols of the first category are a first OQAM symbol from a head of the user data block and the first OQAM symbol from a tail of the user data block, and wherein the data symbols of the second category are a second OQAM symbol from the head of the user data block and the second OQAM symbol from the tail of the user data block, and wherein the actually transmitted data symbols of the data symbols of the second category are target data symbols of the data symbols of the second category, wherein determining the actually transmitted data symbols of the data symbols of the first category according to interference experienced by the data symbols of the second category from all of adjacent OQAM data symbols and the intrinsic interference coefficients from the data symbols of the first category to the data symbols of the second category comprises:

calculating the actually transmitted data symbols of the data symbols of the first category according to the actually transmitted data symbols of the data symbols of the second category, intrinsic interference experienced by the data symbols of the second category from adjacent OQAM symbols excluding the data symbols of the first category and the data symbols of the second category in the user data block, intrinsic interference between subcarriers of the data symbols of the second category, and the intrinsic interference coefficients from the data symbols of the first category to the data symbols of the second category, wherein symbols that are a composite of the actually transmitted data symbols of the data symbols of the second category and the intrinsic interference are complex data symbols comprising information of both the target data symbols of the data symbols of the first category and the target data symbols of the data symbols of the second category, and wherein the target data symbols and actually transmitted data symbols of the data symbols of the second category serve as a real part and an imaginary part of the complex data symbols alternately and are corresponding to the same subcarrier.

4. The method of claim 3, wherein the calculating the actually transmitted data symbols of the data symbols of the first category comprises:

calculating, intrinsic interference experienced by a first data symbol of data symbols of the second category from adjacent OQAM symbols excluding the data symbols of the first category and the data symbols of the second category;

calculating self interference experienced by the first data symbol of the data symbols of the second category from adjacent subcarriers of the data symbol of the second category in the same time slot;

calculating a sum of the intrinsic interference and the self interference and the first data symbol of the data symbols of the second category;

calculating a difference between the target data symbols and the sum;

when an actually transmitted data symbol of the first data symbol is real, obtaining the imaginary part of the difference as residual intrinsic interference in the first data symbol;

when the actually transmitted data symbol of the first data symbol is imaginary, obtaining the real part of the difference as the residual intrinsic interference in the first data symbol;

combining residual intrinsic interferences of all of the data symbols of the second category into residual intrinsic interference of a data symbol vector of the second category as the interference experienced by the data symbol vector of the second category from a data symbol vector of the first category; and calculating the actually transmitted data symbol of each of the data symbols of the first category according to the interference experienced by the data symbol vector of the second category and a matrix composed of intrinsic interference coefficients from the data symbol vector of the first category to the data symbol vector of the second category, wherein the data symbol vector of the first category is a set composed of all of the data symbols of the first category in the user data block, and wherein the data symbol vector of the second category is a set composed of all of the data symbols of the second category in the user data block.

5. The method of claim 4, wherein the intrinsic interference and the self interference are calculated according to intrinsic interference coefficients between OQAM symbols and the first data symbol, and wherein the intrinsic interference coefficients are determined by parameters of a prototype filter employed for generating the OQAM symbols.

6. The method of claim 1, wherein the data symbols of the first category comprise a first OQAM symbol from a head of the user data block and the first OQAM symbol from a tail of the user data block, and wherein the data symbols of the second category comprise OQAM symbols of the second category and quadrature amplitude modulation (QAM) data symbols of the second category, and wherein QAM data symbols of the second category are a second OQAM symbol from the head of the user data block and a second OQAM symbol from the tail of the user data block, and wherein the OQAM data symbols of the second category are a third OQAM symbol from the head of the user data block and a third OQAM symbol from the tail of the user data block, and wherein the actually transmitted data symbols of the data symbols of the first category are dummy data symbols.

7. The method of claim 1, wherein determining the data symbols of the second category according to the interference experienced by the data symbols of the second category from all of the adjacent OQAM data symbols comprises:

calculating actually transmitted data symbols of the OQAM symbols of the second category and QAM symbols of the second category according to interference experienced by the OQAM symbols of the second category from second QAM symbols of the second category, interference experienced by first QAM symbols of the second category from second QAM symbols of the second category in adjacent subcarriers, and interference experienced by the second QAM symbols of the second category from adjacent OQAM symbols of the second category and interference experienced by the second QAM symbols of the second category from first symbols of the second category in adjacent subcarriers.

8. The method of claim 7, wherein:
the OQAM symbols of the second category that is a composite of the actually transmitted data symbols and the interference from the second QAM symbols of the second category equal to target data symbols of the OQAM symbols of the second category;
the QAM symbols of the second category that is a composite of the first QAM symbols of the second category and the interference from the second QAM symbols of the second category in the symbols equal to the target data symbols of the OQAM symbols of the second category; and
the QAM symbols of the second category that is a composite of the second QAM symbols of the second category and the interference from adjacent OQAM symbols of the second category and the interference from the first 3 QAM symbols of the second category equal to the target data symbols of the data symbols of the first category, wherein the actually transmitted data symbols of the QAM symbols of the second category are complex symbols, and wherein in the first QAM symbols of the second category, the target data symbols and actually transmitted data symbols serve as a real part and an imaginary part alternately in a different alternate manner with that in adjacent OQAM symbols of the second category, and wherein a second portion of the second QAM symbols of the second category are complex symbols excluding the first QAM symbols of the second category.

9. The method of claim 7, wherein calculating the actually transmitted data symbols of the OQAM symbols of the second category and the actually transmitted data symbols of the QAM symbols of the second category comprises:
determining an intrinsic interference correlation matrix between the QAM symbols of the second category and the OQAM symbols of the second category according to interference experienced by the OQAM symbols of the second category from the second QAM symbols of the second category, interference experienced by the first QAM symbols of the second category from second QAM symbols of the second category in adjacent subcarriers, interference experienced by the second QAM symbols of the second category from adjacent OQAM symbols of the second category, and interference experienced by the second QAM symbols of the second category from first symbols of the second category in adjacent subcarriers; and
calculating the actually transmitted data symbols of the OQAM symbols of the second category and the actually transmitted data symbols of the QAM symbols of the second category based on a fact that an inherence interference correlation matrix equals to a first data symbol vector, wherein the first data symbol vector is a data symbol vector composed of target data symbols of all of the OQAM symbols of the second category, target data symbols of all of QAM symbols of the second category, and target data symbols of all of the data symbols of the first category.

10. The method of claim 9, wherein the interferences are calculated according to intrinsic interference coefficients between OQAM symbols, and wherein the intrinsic interference coefficients are determined by parameters of a prototype filter employed for generating the OQAM symbols.

11. The method of claim 1, further comprising: configuring time and frequency resources allocated to the user data block via downlink control information beforehand.

12. A method of signal reception in a filter bank multiple carrier (FBMC) system, the method comprising:
receiving a user data block transmitted by a transmitting device, determining a category of an offset quadrature amplitude modulation (OQAM) symbol to be demodulated in the user data block according to a position of the OQAM symbol;
if the OQAM symbol is a data symbol of a first category, skipping demodulation of the data symbol;
if the OQAM symbol is a data symbol of a second category, performing the demodulation to obtain target data symbols of data symbols of the first category and target data symbols of data symbols of the second category; and
if the OQAM symbol is neither a data symbol of the first category nor a data symbol of the second category, extracting a real part or an imaginary part of the OQAM symbol as a received data symbol.

13. The method of claim 12, wherein data symbols of a third category are first $n_1$ OQAM symbols from a head of the user data block and the first $n_1$ OQAM symbols from a tail of the user data block, and wherein the data symbols of the first category are first $n_2$ OQAM symbols from the head of the data symbols of the third category and the first $n_2$ OQAM symbols from the tail of the data symbols of the third category, and wherein the data symbols of the second category are OQAM symbols in the data symbols of the third category excluding the data symbols of the first category, and wherein $n_2<n_1$, $n_1$ and $n_2$ are pre-defined positive integers.

14. The method of claim 12, wherein the data symbols of the first category are a first OQAM symbol from a head of the user data block and the first OQAM symbol from a tail of the user data block, and wherein the data symbols of the second category are a second OQAM symbol from the head of the user data block and a second OQAM symbol from the tail of the user data block, and wherein
if the OQAM symbol is a data symbol of the second category, the real part and the imaginary part of the OQAM symbol are extracted as two received data symbols.

15. The method of claim 12, wherein the data symbols of the first category comprise a first OQAM symbol from a head of the user data block and the first OQAM symbol from a tail of the user data block, and wherein the data symbols of the second category comprise OQAM symbols of the second category and quadrature amplitude modulation (QAM) data symbols of the second category, and wherein the QAM data symbols of the second category are a second OQAM symbol from the head of the user data block and a second OQAM symbol from the tail of the user data block, and wherein the OQAM data symbols of the second category are a third OQAM symbol from the head of the user data block and a third OQAM symbol from the tail of the user data block, wherein if the OQAM symbol is a QAM symbol of the second category, the real part and the imaginary part of the OQAM symbol are extracted as two received data symbols; and wherein if the OQAM symbol is a OQAM symbol of the second category, the real part or the imaginary part of the OQAM symbol is extracted as a received data symbol.

16. An apparatus of signal transmission in a filter bank multiple carrier (FBMC) system, the apparatus comprising:
a symbol calculating circuit configured to determine actually transmitted data symbols of data symbols of a first category or actually transmitted data symbols of data symbols of a second category according to interference experienced by the data symbols of the second category from all of adjacent offset quadrature amplitude modulation (OQAM) data symbols and intrinsic interference coefficients from the data symbols of the first category to the data symbols of the second category; and
a transmitter configured to transmit the actually transmitted data symbols of the data symbols of the second category and the actually transmitted data symbols of the data symbols of the first category to a receiving device together with other data symbols in a user data block.

17. The apparatus of claim 16, wherein the data symbols of the second category that is a composite of the actually transmitted data symbols and the interferences include target data symbols of the data symbols of the second category and target data symbols of the data symbols of the first category, and wherein data symbols of a third category are first $n_1$ OQAM symbols from a head of a user data block and the first $n_1$ OQAM symbols from a tail of the user data block, and wherein the data symbols of the first category are first $n_2$ OQAM symbols from the head of the data symbols of the third category and the first $n_2$ OQAM symbols from the tail of the data symbols of the third category, and wherein the data symbols of the second category are OQAM symbols in the data symbols of the third category excluding the data symbols of the first category.

18. The apparatus of claim 16, further comprising:
a category determining circuit configured to:
receive a user data block transmitted by a transmitting device; and
determine a category of an offset quadrature amplitude modulation (OQAM) symbol to be demodulated in the user data block according to a position of the OQAM symbol; and
a demodulating circuit configured to:
skip demodulation of the OQAM symbol if the OQAM symbol is a data symbol of the first category;
perform the demodulation to obtain target data symbols of data symbols of the first category and target data symbols of data symbols of the second category if the OQAM symbol is a data symbol of the second category; and
extract a real part or an imaginary part of the OQAM symbol as a received data symbol if the OQAM symbol is neither a data symbol of the first category nor a data symbol of the second category,
wherein data symbols of a third category are the first $n_1$ OQAM symbols from a head of the user data block and the first $n_1$ OQAM symbols from a tail of the user data block, and wherein the data symbols of the first category are the first $n_2$ OQAM symbols from the head of the data symbols of the third category and the first $n_2$ OQAM symbols from the tail of the data symbols of the third category, and wherein the data symbols of the second category are OQAM symbols in the data symbols of the third category excluding the data symbols of the first category, and wherein $n_2<n_1$ and $n_2$ are predefined positive integers.

19. The apparatus of claim 16, wherein the data symbols of the first category are a first OQAM symbol from the head of the user data block and the first OQAM symbol from the tail of the user data block, and wherein the data symbols of the second category are a second OQAM symbol from a head of the user data block and the second OQAM symbol from a tail of the user data block, and wherein if the OQAM symbol is a data symbol of the second category, a real part and an imaginary part of the OQAM symbol are extracted as two received data symbols.

20. The apparatus of claim 16, wherein the data symbols of the first category comprise a first OQAM symbol from a head of the user data block and the first OQAM symbol from a tail of the user data block, and wherein the data symbols of the second category comprise OQAM symbols of the second category and quadrature amplitude modulation (QAM) data symbols of the second category, and wherein the QAM data symbols of the second category are a second OQAM symbol from the head of the user data block and a second OQAM symbol from the tail of the user data block, and wherein the OQAM data symbols of the second category are a third OQAM symbol from the head of the user data block and a third OQAM symbol from the tail of the user data block,
wherein if the OQAM symbol is a QAM symbol of the second category, a real part and an imaginary part of the OQAM symbol are extracted as two received data symbols; and wherein if the OQAM symbol is a OQAM symbol of the second category, the real part or the imaginary part of the OQAM symbol is extracted as a received data symbol.

* * * * *